(12) United States Patent
Glime, III

(10) Patent No.: US 12,474,228 B2
(45) Date of Patent: Nov. 18, 2025

(54) SYSTEMS AND METHODS FOR CONTROL AND MONITORING OF ACTUATED VALVES

(71) Applicant: Swagelok Company, Solon, OH (US)

(72) Inventor: William H. Glime, III, Chagrin Falls, OH (US)

(73) Assignee: SWAGELOK COMPANY, Solon, OH (US)

( * ) Notice: Subject to any disclaimer, the term of this patent is extended or adjusted under 35 U.S.C. 154(b) by 46 days.

(21) Appl. No.: 18/521,161

(22) Filed: Nov. 28, 2023

(65) Prior Publication Data

US 2024/0125666 A1    Apr. 18, 2024

Related U.S. Application Data

(63) Continuation of application No. 17/346,591, filed on Jun. 14, 2021, now Pat. No. 11,867,589, which is a
(Continued)

(51) Int. Cl.
*G01M 3/02* (2006.01)
*F15B 11/064* (2006.01)
(Continued)

(52) U.S. Cl.
CPC .......... *G01M 3/02* (2013.01); *F15B 13/024* (2013.01); *F15B 13/027* (2013.01);
(Continued)

(58) Field of Classification Search
CPC .............. F16K 31/122; F16K 31/1221; F16K 31/1223; F16K 31/34; F16K 15/025
See application file for complete search history.

(56) References Cited

U.S. PATENT DOCUMENTS

| | | |
|---|---|---|
| 4,679,583 A | 7/1987 | Lucas et al. |
| 4,976,144 A | 12/1990 | Fitzgerald |
| (Continued) | | |

FOREIGN PATENT DOCUMENTS

| | | |
|---|---|---|
| AU | 2010257403 | 8/2011 |
| CN | 13003875 | 6/2001 |
| (Continued) | | |

OTHER PUBLICATIONS

International Search Report and Written Opinion from PCT/US2024/027129 dated Jul. 19, 2024.
(Continued)

*Primary Examiner* — Daphne M Barry
(74) *Attorney, Agent, or Firm* — Calfee, Halter & Griswold LLP

(57) ABSTRACT

An actuated valve system includes a valve including a flow controlling valve element, an actuator assembled with the valve and including an inlet port in fluid communication with a fluid driven actuator member operatively connected with the valve element and movable from a normal position to an actuated position in response to pressurization of the inlet port to at least a minimum actuating pressure, a pilot valve operable to supply pressurized fluid to the actuator inlet port in a first position and to exhaust pressurized fluid from the actuator inlet port through an exhaust port in the pilot valve in a second position, and a backpressure arrangement in fluid communication with the actuator inlet port to retain a positive pressure smaller than the minimum actuating pressure against the actuator member when the pilot valve is moved to the second position.

19 Claims, 16 Drawing Sheets

Related U.S. Application Data continuation of application No. 16/223,260, filed on Dec. 18, 2018, now Pat. No. 11,073,442.

(60) Provisional application No. 62/693,009, filed on Jul. 2, 2018, provisional application No. 62/608,777, filed on Dec. 21, 2017, provisional application No. 62/608,771, filed on Dec. 21, 2017.

(51) Int. Cl.
*F15B 13/02* (2006.01)
*F15B 15/14* (2006.01)
*F15B 15/20* (2006.01)
*F15B 15/22* (2006.01)
*F15B 19/00* (2006.01)
*F15B 20/00* (2006.01)
*F15B 21/10* (2006.01)
*F16K 31/12* (2006.01)
*F16K 37/00* (2006.01)

(52) U.S. Cl.
CPC ........ *F15B 15/1409* (2013.01); *F15B 15/204* (2013.01); *F15B 15/22* (2013.01); *F15B 19/005* (2013.01); *F15B 21/10* (2013.01); *F16K 31/12* (2013.01); *F16K 37/0041* (2013.01); *F15B 11/064* (2013.01); *F15B 20/005* (2013.01); *F15B 2211/30505* (2013.01); *F15B 2211/40507* (2013.01); *F15B 2211/50518* (2013.01); *F15B 2211/50545* (2013.01); *F15B 2211/5151* (2013.01); *F15B 2211/5153* (2013.01); *F15B 2211/555* (2013.01); *F15B 2211/6306* (2013.01); *F15B 2211/6309* (2013.01); *F15B 2211/6313* (2013.01); *F15B 2211/632* (2013.01); *F15B 2211/7052* (2013.01); *F15B 2211/857* (2013.01); *F15B 2211/8606* (2013.01); *F15B 2211/864* (2013.01); *F15B 2211/865* (2013.01); *F15B 2211/87* (2013.01); *F15B 2211/8855* (2013.01)

(56) References Cited

U.S. PATENT DOCUMENTS

| | | |
|---|---|---|
| 5,197,328 A | 3/1993 | Fitzgerald |
| 5,431,182 A | 7/1995 | Brown |
| 5,549,137 A | 8/1996 | Lenz |
| 5,573,032 A | 11/1996 | Lenz |
| 6,026,352 A | 2/2000 | Burns |
| 6,035,878 A | 3/2000 | Adams et al. |
| 6,273,401 B1 | 8/2001 | Payne |
| 6,356,811 B1 | 3/2002 | Beselt |
| 6,678,584 B2 | 1/2004 | Junk et al. |
| 7,222,016 B2 | 5/2007 | Snowbarger et al. |
| 7,744,060 B2 | 6/2010 | Sneh |
| 8,413,677 B1* | 4/2013 | Coffman ............... F15B 13/024 137/488 |
| 8,997,886 B2 | 4/2015 | Ding |
| 9,348,339 B2 | 5/2016 | Ding et al. |
| 9,441,453 B2 | 9/2016 | Lymberopoulos et al. |
| 9,465,391 B2 | 10/2016 | Grumpstrup et al. |
| 9,846,102 B2 | 12/2017 | Tharaldson et al. |
| 9,880,564 B2 | 1/2018 | Wagner-Stuerz |
| 9,909,682 B2 | 3/2018 | Sneh |
| 10,031,531 B2 | 7/2018 | Ding |
| 10,126,760 B2 | 11/2018 | Ding et al. |
| 10,353,408 B2 | 7/2019 | Ding et al. |
| 10,527,185 B2 | 1/2020 | Buerkert |
| 10,649,471 B2 | 5/2020 | Ding et al. |
| 10,725,484 B2 | 7/2020 | L'Bassi et al. |
| 10,969,799 B2 | 4/2021 | Ding et al. |
| 11,073,442 B2 | 7/2021 | Glime, III |
| 11,242,934 B2 | 2/2022 | Kondo et al. |
| 11,243,549 B2 | 2/2022 | Tanno et al. |
| 11,867,589 B2 | 1/2024 | Glime |
| 2003/0070710 A1 | 4/2003 | Inayama |
| 2006/0021656 A1 | 2/2006 | Kajitani |
| 2006/0213561 A1 | 9/2006 | Tiwet |
| 2006/0219299 A1 | 10/2006 | Snowbarger |
| 2007/0017573 A1 | 1/2007 | Frampton |
| 2008/0065355 A1 | 3/2008 | Bredau et al. |
| 2008/0236383 A1 | 10/2008 | Matsumoto et al. |
| 2009/0222220 A1 | 9/2009 | Wilke |
| 2009/0240376 A1 | 9/2009 | Elschafei |
| 2010/0138051 A1 | 6/2010 | Glime |
| 2016/0305556 A1 | 10/2016 | Turnaus |
| 2016/0305568 A1* | 10/2016 | Turnaus ................. F16K 31/02 |
| 2018/0112682 A1 | 4/2018 | Valentin-Rumpel |
| 2024/0370042 A1* | 11/2024 | Glime, III ............ F15B 21/087 |

FOREIGN PATENT DOCUMENTS

| | | |
|---|---|---|
| CN | 1807862 | 7/2006 |
| CN | 1914384 | 2/2007 |
| CN | 201107611 | 8/2008 |
| CN | 101512162 | 8/2009 |
| CN | 103308288 | 9/2013 |
| CN | 103899830 | 7/2014 |
| CN | 203770808 | 8/2014 |
| CN | 104344935 | 2/2015 |
| CN | 104395615 | 3/2015 |
| CN | 204588512 | 8/2015 |
| CN | 107655669 | 2/2018 |
| DE | 102005048646 | 2/2007 |
| DE | 102015007568 | 12/2015 |
| DE | 102016201988 | 6/2017 |
| DE | 102016105881 | 10/2017 |
| EP | 2085622 | 8/2009 |
| EP | 2752585 | 7/2014 |
| EP | 1931962 | 8/2015 |
| EP | 2575633 | 1/2016 |
| EP | 3287680 | 2/2018 |
| FR | 2951774 | 4/2011 |
| JP | H01244330 | 9/1989 |
| WO | 2017/196600 | 11/2017 |

OTHER PUBLICATIONS

International Search Report and Written Opinion from PCT/US2018/066124 dated May 10, 2019.

Search Report and Written Opinion from Singapore Application No. 11202003892T dated Jan. 20, 2022.

Office action from Chinese Application No. 201880073733.4 dated Apr. 2, 2022.

Office action from U.S. Appl. No. 18/651,937 dated Jul. 23, 2025.

* cited by examiner

SYSTEMS AND METHODS FOR CONTROL AND MONITORING OF ACTUATED VALVES

CROSS-REFERENCE TO RELATED APPLICATIONS

This application is a continuation of U.S. Non-Provisional patent application Ser. No. 17/346,591, filed on Jun. 14, 2021, for SYSTEMS AND METHODS FOR CONTROL AND MONITORING OF ACTUATED VALVES, which is a continuation of U.S. Non-Provisional patent application Ser. No. 16/223,260, filed on Dec. 18, 2018, now U.S. Pat. No. 11,073,442, issued Jul. 27, 2021, for SYSTEMS AND METHODS FOR CONTROL AND MONITORING OF ACTUATED VALVES, which claims the benefit of U.S. Provisional Patent Application Ser. No. 62/608,771, filed on Dec. 21, 2017 and entitled SYSTEMS AND METHODS FOR MONITORING ACTUATED VALVES, U.S. Provisional Patent Application Ser. No. 62/608,777, filed on Dec. 21, 2017 and entitled ACTUATED VALVE SYSTEMS WITH REDUCED ACTUATOR RETURN FORCE, and U.S. Provisional Patent Application Ser. No. 62/693,009, filed on Jul. 2, 2018, and entitled SYSTEMS AND METHODS FOR CONTROL AND MONITORING OF ACTUATED VALVES, the entire disclosures of each of which are incorporated herein by reference.

BACKGROUND

Actuators are often used to control the operation of valves and other fluid system components. An actuator may be of any number of different designs including pneumatic, hydraulic, electric and so on. Fluid driven actuators use pressurized fluid, such as air, to move one or more fluid driven actuator members (e.g., pistons, diaphragms, bellows, etc.) in order to move a valve element (e.g., a rotary valve stem, plug, diaphragm, and/or bellows) for control (e.g., shutoff, metering, directional control) of system fluid passing through the valve.

A conventional actuated valve assembly uses a spring biased pneumatic actuator for two-position operation of the valve between an actuated position, in response to pressurization of the actuator inlet port to overcome the biasing spring and move the actuator piston and connected valve member, and a normal or return position, in response to venting of the actuator inlet pressure and spring movement of the actuator piston and valve member.

The cycle life of a valve actuated by a piston-style actuator is often limited by the actuator piston seals (e.g., O-rings or gaskets), which may be subject to frequent cycle movement (and corresponding wear), extreme temperatures, and harsh atmospheric conditions. As a result of these conditions, piston seal wear or loss of lubricant can lead to leakage past the actuator seals and/or increased friction of the piston within the actuator housing. Over time, this increasing leakage or friction may result in incomplete or impeded valve actuation and eventual valve failure, resulting in compromised fluid supplies, unscheduled system downtime, and repair costs.

In other applications, undesirable conditions in the valve (e.g., increased friction, seat damage, system contamination) may result in increased resistance to actuation within the valve, which may result in an impeded or stuck condition of the actuated valve, in addition to potential valve leakage and/or fluid system contamination. In still other applications, undesirable conditions in the valve (e.g., loss of packing load, fractured actuator spring or valve element) may result in reduced resistance to actuation within the valve, which may result in valve leakage.

In still other applications, actuator pressurization forces and/or spring return stroke forces may produce undesirable conditions, including excessive closing force between the valve member and valve seat (which may result in seat/seal wear, deformation, and/or particle generation) or valve actuation that is faster or slower than desired. To provide an adequate seal against the valve element in a shutoff condition, a valve is often provided with a soft (e.g., plastic, elastomer) valve seat against which the valve element seals upon valve closure. In applications involving high cycle frequency, high actuator pressures (in the case of a "normally open" fluid driven actuator) and/or valve seat distorting conditions, such as high temperature, high flow, or chemical reactivity, the closing force between the valve element and the valve seat may generate wear particles, which may contaminate the fluid system and/or result in valve seat leakage.

SUMMARY

In an exemplary embodiment of the present disclosure, a method of monitoring performance of a fluid driven actuator for a valve is contemplated. In an exemplary method, pressurized fluid is supplied through an actuator supply line to an inlet port of the actuator during a first time period to operate the actuator. Changes corresponding to a fluid flow condition in the actuator supply line are measured during the first time period, and the measured changes are analyzed to identify a non-compliant condition in at least one of the valve and the actuator. An output communicating the identified non-compliant condition is then generated.

In another exemplary embodiment of the present disclosure, an actuated valve system includes a valve including a flow controlling valve element, and an actuator assembled with the valve and including a fluid driven actuator member operatively connected with the valve element and movable from a normal position to an actuated position in response to pressurization of an inlet port of the actuator. A pilot valve is connected with the actuator inlet port by an actuator supply line, the pilot valve being operable to supply pressurized fluid to the actuator supply line in a first position, and to exhaust pressurized fluid from the actuator supply line in a second position. A pressure containment device is connected with the actuator supply line to maintain a set pressure in the actuator supply line when the pilot valve is in at least one of the first and second positions. A sensor is connected with the actuator supply line, the sensor being configured to measure a fluid flow condition in the actuator supply line corresponding to at least one of movement of the actuator member between the normal position and the actuated position, and leakage of pressurized fluid past the actuator member.

In another exemplary embodiment of the present disclosure, an actuated valve system includes a valve having a flow controlling valve element, an actuator assembled with the valve, a valve control module, a sensor, and a controller. The actuator includes a fluid driven actuator member operatively connected with the valve element and movable from a normal position to an actuated position in response to pressurization of an inlet port of the actuator. The valve control module includes an actuation port connected with the actuator inlet port, a pressurization port for connection with a source of pressurized fluid, and an exhaust port. The valve control module further includes a pilot valve arrangement operable between a first condition permitting flow between the pressurization port and the actuation port and blocking flow between the actuation port and the exhaust port for pressurization of the actuator inlet port, a second condition blocking flow between the pressurization port and the actuation port and blocking flow between the actuation port and the exhaust port to capture pressurized fluid in the actuator inlet port, and a third condition blocking flow between the pressurization port and the actuation port and permitting flow between the actuation port and the exhaust port for venting of the actuator inlet port. The sensor is in fluid communication with the actuator inlet port to measure a fluid condition of the actuator inlet port. The controller is in circuit communication with the sensor and with the pilot valve arrangement for operation of the pilot valve arrangement to the first, second and third conditions, wherein the controller is configured to automatically adjust operation of the pilot valve arrangement in response to the measured fluid condition communicated to the controller from the sensor.

In another exemplary embodiment of the present disclosure, an actuated valve system includes a valve including a flow controlling valve element and an actuator assembled with the valve. The actuator includes a fluid driven actuator member operatively connected with the valve element and movable with the valve element from a normal position to an actuated position in response to pressurization of an inlet port of the actuator, and a biasing spring configured to return the actuator member and valve element from the actuated position to the normal position in response to venting of the pressurized actuator. The biasing spring arrangement has a spring rate configured such that the actuator pressure required to move the actuator member and valve element from the normal position to the actuated position is at least 50% greater than the actuator pressure required to begin the actuator stroke from the normal position.

In another exemplary embodiment of the present application, an actuated valve system includes a valve, an actuator, a pilot valve, and a backpressure arrangement. The actuator includes an inlet port in fluid communication with a fluid driven actuator member operatively connected with a valve element and movable from a normal position to an actuated position in response to pressurization of the inlet port to at least a minimum actuating pressure. The actuator is configured to apply a biasing force to return the actuator member to the normal position upon depressurization of the inlet port. The pilot valve has a supply port connected with the actuator inlet port, and is operable to supply pressurized fluid to the actuator inlet port in a first position, and to exhaust pressurized fluid from the actuator inlet port through an exhaust port in the pilot valve in a second position. The backpressure arrangement is in fluid communication with the actuator inlet port to retain a positive pressure smaller than the minimum actuating pressure against the actuator member when the pilot valve is moved to the second position.

In another exemplary embodiment of the present application, a backpressure device includes a body defining a passage extending from an inlet port to an outlet port, a seat disposed in the passage, a seal member disposed in the body, and an engineered leak path in fluid communication with the inlet port. The seal member is biased into sealing engagement with the seat at a set pneumatic pressure applied to the inlet port, the seal member separating from the seat to release through the outlet port any excess pneumatic pressure greater than the set pneumatic pressure applied to the inlet port. The engineered leak path is configured to provide a leak rate between about 0.25 sccm and 2.5 sccm at an inlet pressure equal to the set pneumatic pressure.

DETAILED DESCRIPTION OF EXEMPLARY EMBODIMENTS

Figure 1:
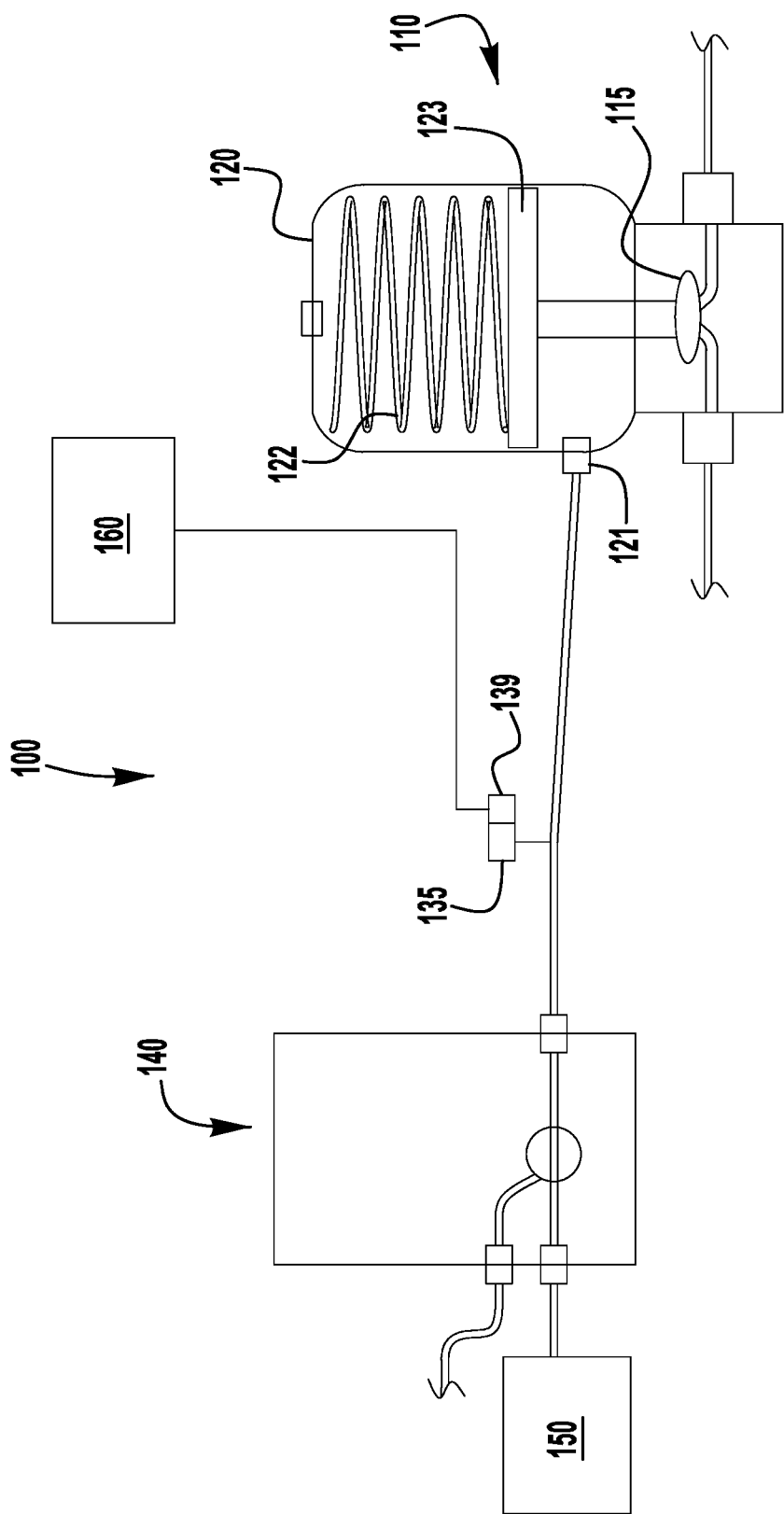
FIG. 1 is a schematic view of an actuated valve system, in accordance with an exemplary embodiment of the present disclosure.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present disclosure may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

The present disclosure contemplates systems and methods for monitoring and/or controlling performance of a fluid driven (e.g., pneumatic) actuator. For example, performance of a fluid driven actuator may be monitored to identify actuator failure, valve failure, or conditions (e.g., leakage past the fluid driven actuator member, changes in required actuation force) indicating that actuator failure or valve failure is imminent. While exemplary embodiments in the present disclosure relate to spring biased pneumatic actuator assembled with linearly actuated valves (e.g., diaphragm valves), the features and aspects described in the present disclosure may additionally or alternatively be applied to other types of actuators (e.g., hydraulic or other fluid driven actuators, non-spring biased actuators, double acting actuators), other types of valves (e.g., rotary valves, gate valves, etc.), and other types of pressurized fluid applications.

While sensors installed in or assembled with the valve (e.g., flowmeters, electromechanical switches) may monitor valve conditions and performance characteristics of the valve, extreme or demanding system fluid conditions (e.g., pressure, temperature, corrosive/caustic fluids) may limit the types of sensors that may be used and/or the service life of such sensors.

According to an exemplary aspect of the present disclosure, valve and actuator performance may be monitored by measuring actuator fluid flow conditions, which may, but need not, provide for measuring or sensing such conditions at a location remote from the valve actuator in the actuator fluid circuit, for example, at or proximate to a pilot valve that selectively supplies pressurized actuator fluid to an actuator supply line connected with an inlet port of the actuator. At this remote location, isolation from any extreme or demanding system fluid or environmental conditions may be accomplished.

Different types of sensors may be provided in fluid communication with a valve actuator. As one example, a flow sensor directly or indirectly connected with the actuator may be used to detect flow associated with fluid pressure or spring return movement of an actuator piston (e.g., to confirm actuation of the valve, timing of actuation, duration of actuation, pressure required for actuation, etc.), or flow associated with leakage past the actuator piston (e.g., to identify progressive actuator wear, or impending actuator failure due to gross leakage). As another example, a pressure sensor directly or indirectly connected with the actuator may also be used to detect changes in actuator supply line pressure associated with fluid pressure or spring return movement of the actuator piston (e.g., to confirm actuation of the valve, timing of actuation, duration of actuation, pressure required for actuation, etc.), or with leakage past the actuator piston (e.g., to identify progressive actuator wear, or impending actuator failure due to gross leakage).

FIG. 1 schematically illustrates an actuated valve system 100 including an actuated valve 110 having a fluid operated (e.g., pneumatic) actuator 120 having an actuator port 121 connected to an actuator fluid source 150 by an actuator supply line 129 and a pilot valve 140 (e.g., solenoid operated switching valve) or other supply valve. The actuator supply line 129 may be formed from a variety of components and arrangements, including, for example, separate conduit components (e.g., tube, pipe, hose) and porting or passages integrated into either or both of the actuator and pilot valve, such that the pilot valve may be assembled directly to the actuator port.

To actuate the valve 110, the pilot valve 140 is operated to open the actuator fluid source 150 to the actuator port 121, to supply pressurized actuator fluid to the actuator inlet port to move the actuator piston 123, thereby moving the valve element 115. This results in fluid flow through the actuator supply line and an increase in pressure in the actuator supply line. The pressure and/or flow may be monitored by a sensor 135 (e.g., pressure transducer, flowmeter) in fluid communication with the actuator supply line 129. The sensor 135 may be provided with control circuitry 139, which may be connected with (e.g., by a wired or wireless connection) a system controller 160 (e.g., computer) proximate to or remote from the sensor 135. The system controller 160 may include circuitry (e.g., microprocessor) for analyzing the measured changes in the fluid flow conditions to verify normal operating conditions or to identify non-compliant system conditions.

In the above described arrangement, detection of failure of the actuated valve 110, or other non-compliant conditions, for example, based on deviations in actuator fluid flow from expected flow during actuation (e.g., stored predetermined or previously generated parameters), can be used to provide alerts to the user of the failure condition (e.g., through communication with the system controller 160), for example, to prompt system shutdown and valve maintenance or replacement.

Additionally, detection of actuated valve performance deviations in a still functioning valve may be used to provide alerts to the user of conditions likely to progress to valve failure. As one example, a measurable decrease in pressure within the pressurized actuator supply line or a measurable flow through the actuator supply line 129 when the actuator 120 is pressurized but not being actuated may indicate leakage past the fluid driven actuator member 123 (e.g., actuator piston). In a high cycle valve, actuator piston seal wear and/or loss of lubricant can cause increasing actuator piston leakage over the life of the actuator, until the leakage becomes severe enough to limit or prevent valve actuation. By identifying actuator piston leakage before the level of leakage reaches an actuation impeding level, planned maintenance may be performed on the actuator during a scheduled downtime, thereby avoiding emergency shutdowns and/or lost production.

As another example, the identification of the occurrence of a valve actuation at a greater than expected actuator inlet pressure, by measuring a change or inflection in the actuator inlet pressure corresponding to actuation, or by measuring the time delay or duration at which a change in inlet pressure or flow rate corresponding to actuator piston movement occurs, may indicate increased valve resistance to actuation, for example, due to valve element wear or galling, loss of lubrication, system contamination, or other factors. Early identification of these potential conditions may allow for timely valve maintenance.

As yet another example, the identification of the occurrence of a valve actuation at a lower than expected actuator inlet pressure, by measuring a change or inflection in the actuator inlet pressure corresponding to actuation, or by measuring the time delay or duration at which a change in inlet pressure or flow rate corresponding to actuator piston movement occurs, may indicate reduced valve resistance to actuation, for example, due to loss of packing load, weakening of diaphragm/bellows biasing forces, or other such factors. Early identification of these potential conditions may allow for timely valve maintenance.

By communicating these measured performance conditions to a system controller programmed to diagnose and address problematic valve performance conditions, valve maintenance may be automatically initiated either upon detection of a valve failure, or in anticipation of an impending valve failure. The system controller may be programmed to automatically schedule maintenance procedures, requisition parts from stock, or place orders for replacement system components and assemblies.

Figure 2:
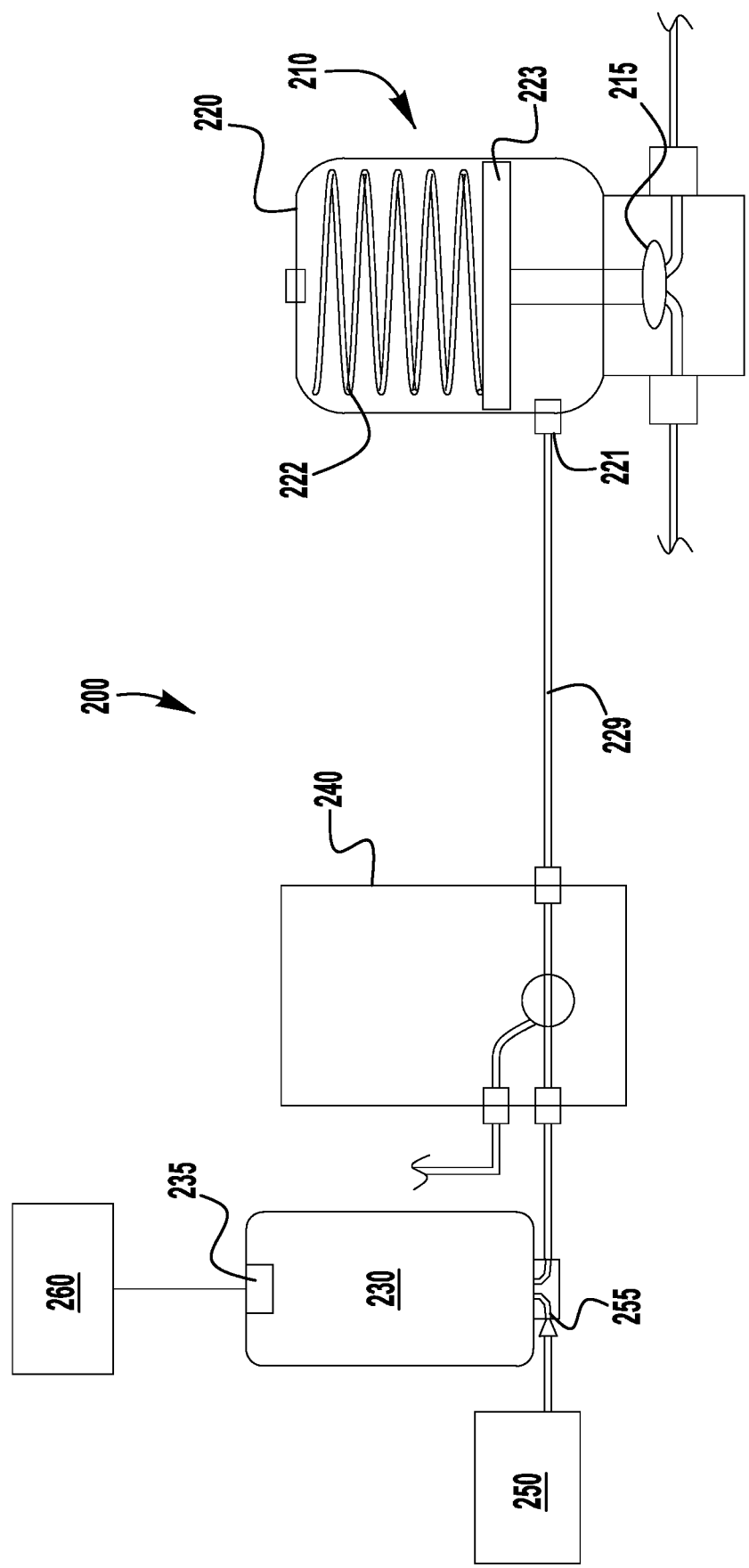
FIG. 2 is a schematic view of an actuated valve system, in accordance with another exemplary embodiment of the present disclosure.

In an exemplary embodiment of the present disclosure, performance conditions of an actuated valve are determined by measuring the pressure profile of a piston-style actuator before, during, and after valve actuation, using a pressure transducer (or other such pressure sensor) that measures the pressure of a pressurized volume or chamber of actuator fluid (e.g., air, nitrogen) upstream of the actuator. A pressure containment device (e.g., pressurized cylinder or other such chamber, or a backpressure device) may be connected in fluid communication with the actuator supply line to maintain a set pressure in the actuator supply line from which deviations in the set pressure may be measured. In an exemplary arrangement, as schematically shown in FIG. 2, an actuated valve system 200 includes an actuated valve 210 having a pneumatically operated actuator 220 with an actuator port 221 connected to a pressurized chamber 230 (e.g., sample cylinder) by an actuator supply line 229 and a pilot valve 240 (e.g., solenoid operated switching valve) or other supply valve, with the pressurized chamber 230 connected with an actuator fluid source 250. To actuate the valve 210, the pilot valve 240 is operated to open the pressurized chamber 230 to the actuator port 221, to supply pressurized actuator fluid from the chamber to the actuator inlet port. This results in a temporary decrease in pressure within the chamber 230, until the chamber is refilled by the actuator fluid source 250 and the pressure is restored. The pressure within the chamber 230 is monitored by a pressure transducer 235, which may be connected with (e.g., by a wired or wireless connection) a system controller 260 (e.g., computer) proximate to or remote from the pressure transducer 235.

Figure 3:
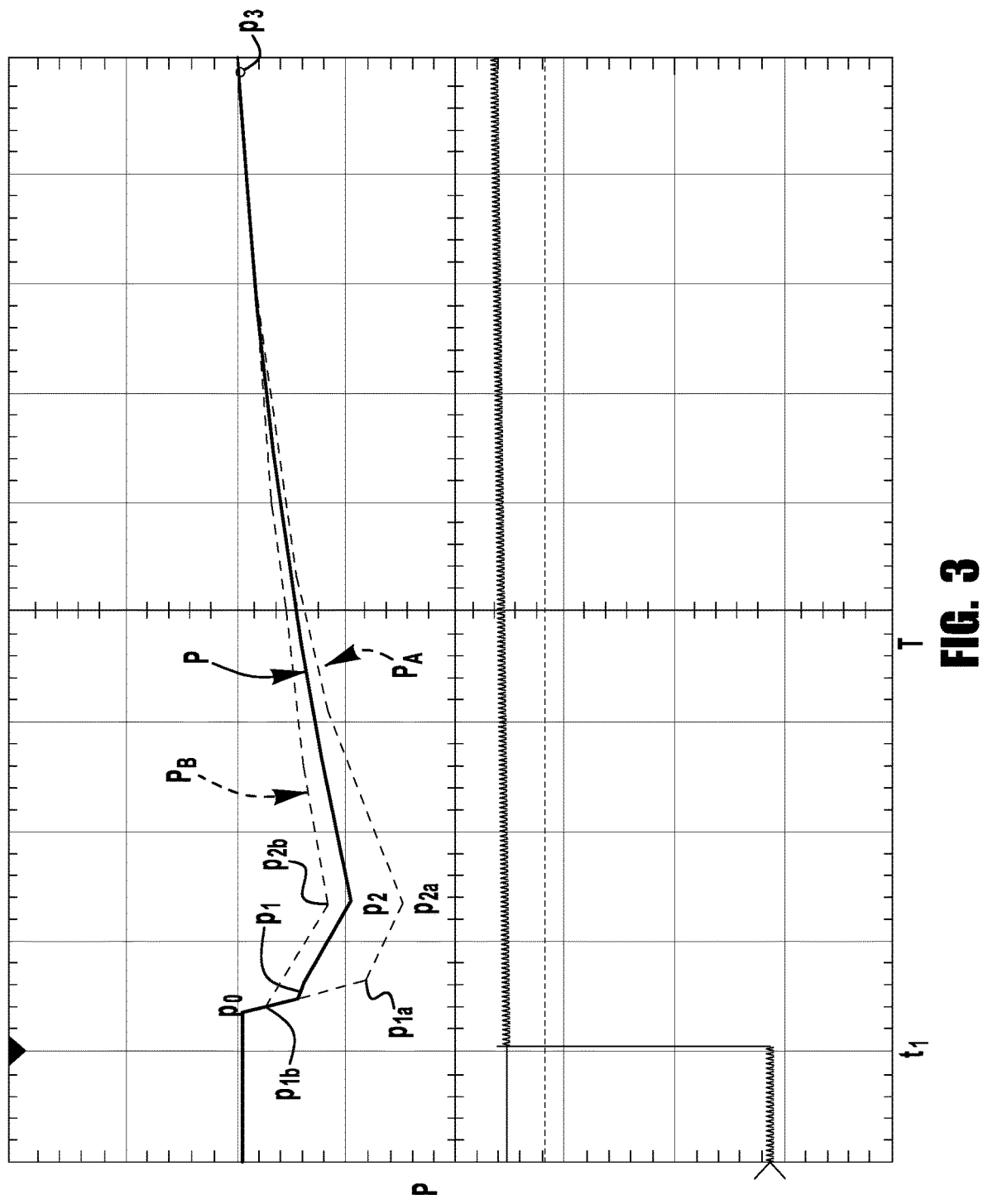
FIG. 3 illustrates exemplary valve cycle pressure profiles of the actuated valve system of FIG. 2, indicating full valve operation.

As shown in the valve cycle pressure profile P of FIG. 3, and with reference to the schematic embodiment of FIG. 2, when the pressurized actuator fluid is initially supplied to a properly functioning actuator 220 (e.g., by opening a pilot valve between the pressurized volume and the actuator), at time $t_1$ (corresponding to actuation of the pilot valve to the open position), the pressure within the pressurized chamber 230, as measured by the pressure transducer, decreases from a set pressure $p_0$ to a first reduced pressure $p_1$, as the supplied fluid pressure builds on the actuator piston 223 to a pressure sufficient to move the piston (e.g., against a biasing spring 222 and/or valve element 215 resistance). As the actuator piston 223 moves to the actuated position and the pressurized fluid fills a cavity 224 in the actuator behind the piston, the pressure within the chamber 230 further decreases from the first reduced pressure $p_1$ to a second reduced pressure $p_2$, generally at a shallower or more gradual slope than the pressure change from set pressure $p_0$ to first reduced pressure $p_1$.

To restore the pressure in the pressurized chamber 230, the actuator fluid source 250 supplies pressurized actuator fluid to the pressurized chamber. While the actuator fluid source 250 may be selectively opened to the pressurized chamber 230 (e.g., by user initiated or programmed opening of a supply valve), in another embodiment, flow between the actuator fluid source and the pressurized chamber is limited using a reduced orifice or other flow restriction 255 to delay pressure increases within the chamber 230, such that the changes in chamber pressure resulting from valve actuation may be more easily measured. The result of this restricted flow condition is evident in the slope of the pressure curve between the second reduced pressure $p_2$ and the post-actuation recovered pressure $p_3$, which shows the gradual increase in pressure within the pressurized chamber after actuation of the valve is completed.

Deviations from the typical pressure profile P of FIG. 3 may provide an indication of a worn, damaged or defective condition in the valve or actuator. For example, as shown in the valve cycle pressure profile $P_A$, a first reduced pressure $p_{1a}$ that is lower than expected may indicate increased resistance to actuation (requiring higher fluid pressure as supplied by the pressurized chamber), for example, due to increased friction between the actuator piston and housing or between the valve stem (or other valve element) and the valve seat. As another example, as shown in the valve cycle pressure profile $P_B$, a first reduced pressure $p_{1b}$ that is higher than expected may indicate reduced resistance to actuation (requiring lower fluid pressure as supplied by the pressurized chamber), for example, due to reduced valve packing or seat sealing load, a fractured or weakened valve diaphragm or bellows, or a fractured or weakened actuator spring.

Figure 4:
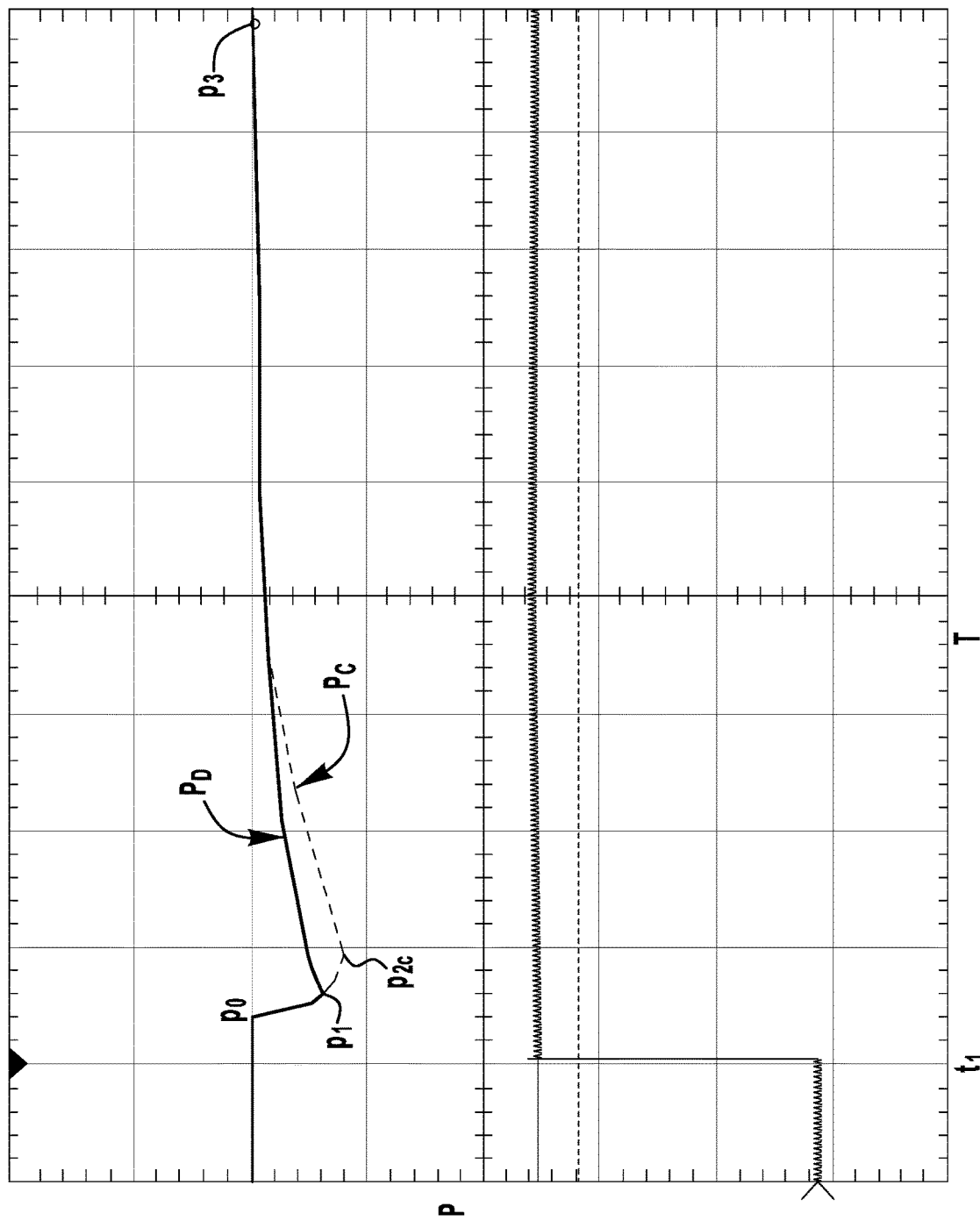
FIG. 4 illustrates exemplary valve cycle pressure profiles of the actuated valve system of FIG. 2, indicating incomplete or failed actuation.

As still another example, as shown in the valve cycle pressure profile $P_C$ of FIG. 4, a second reduced pressure $p_{2c}$ that is higher than expected and/or at an earlier time T than expected (as compared to the pressure point $p_{2b}$ in FIG. 3) may indicate an incomplete actuator stroke, while the substantial absence of a second reduced pressure point, as shown in the valve cycle pressure profile $P_D$, with the pressure curve increasing from the first reduced pressure $p_1$ to the post-actuation recovered pressure $p_3$ may indicate a valve or actuator that is stuck.

Figure 5:
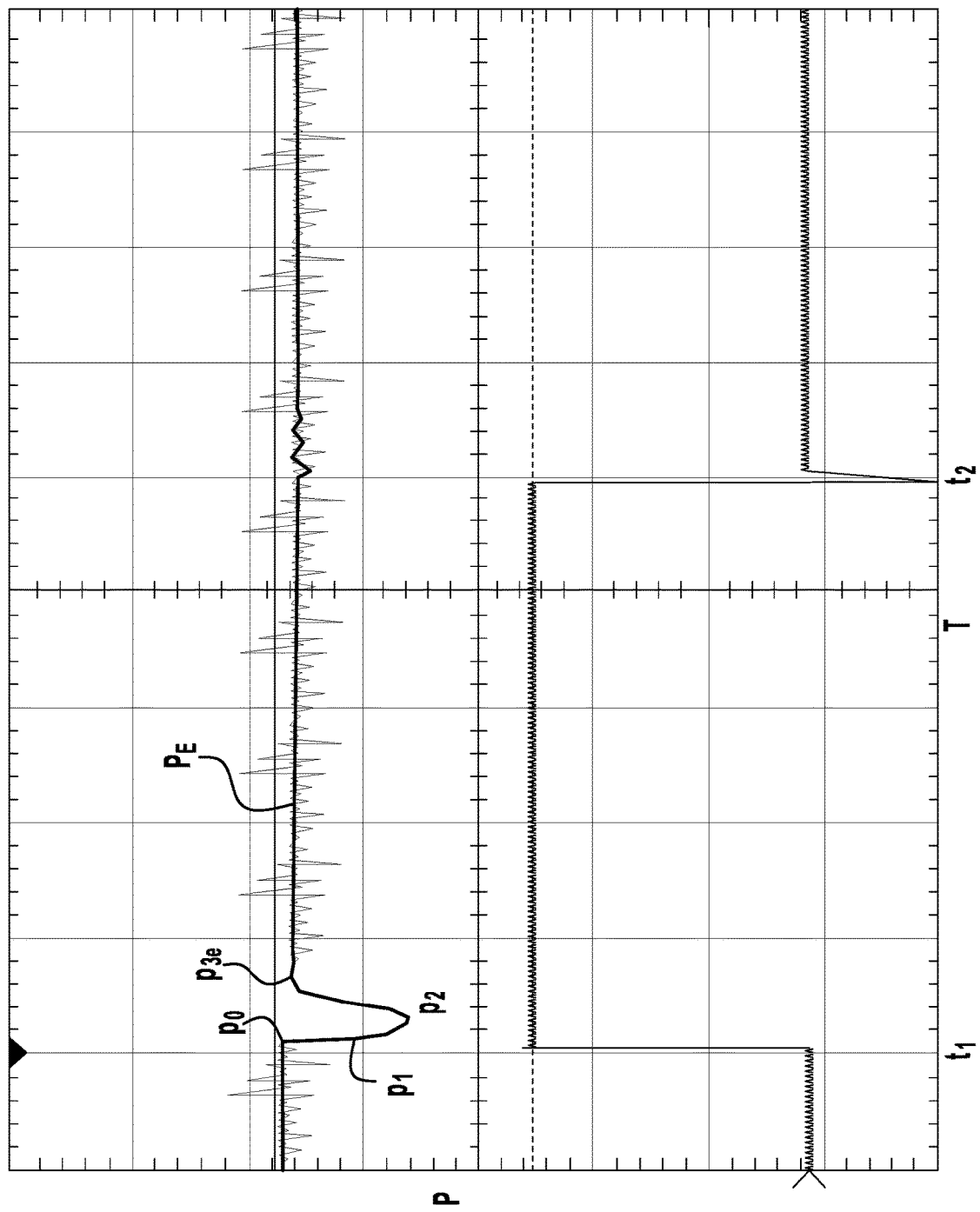
FIG. 5 is an exemplary valve cycle pressure profile of the actuated valve system of FIG. 2, indicating leakage past the actuator piston.

As yet another example, as shown in the valve cycle pressure profile $P_E$ of FIG. 5, a post-actuation recovered pressure $p_{3e}$ that is lower than the set pressure $p_0$ may indicate leakage past the actuator piston sufficient to prevent full recovery of the pressure in the pressurized chamber until the pilot valve is closed. In many applications, leakage of pressurized actuator fluid past the actuator, for example, due to worn piston seals, or dried or otherwise lost lubricant, is a precursor to complete actuator failure (e.g., due to gross actuator leakage) resulting in the valve being stuck (e.g., in the spring-biased closed position). Accordingly, initial detection of smaller amounts of leakage may allow for diagnosis of impending gross leakage and actuator failure. This initial leak detection may be relied upon for scheduled maintenance, such as actuator repair or replacement.

When the system controller 260 analyzes the measured changes in the valve cycle pressure profile and identifies such deviating pressure conditions, the system controller may generate an output communicating the non-compliant condition, which may be provided in the form of an audible or visual alert, or an alert message (e.g., text or email message).

In applications where a pressure sensor is disposed upstream from the pilot valve, as in the embodiment of FIG. 2, characteristics of the valve/actuator performance cannot be measured by the sensor when the pilot valve is in the closed or actuator venting condition. In another arrangement, a pressure sensor or pressure transducer may be provided downstream from the pilot valve and upstream from the actuator, to allow for detection of changes in actuator inlet pressure regardless of whether the pilot valve is in the actuator pressurizing condition or in the actuator venting condition. In an exemplary embodiment, as schematically shown in FIG. 6, an actuated valve system 300 includes a valve 310 having a pneumatically operated actuator 320 with an actuator port 321 connected to an actuator fluid source 350 by an actuator supply line 329 and pilot valve 340 (e.g., solenoid operated switching valve) or other supply valve, with a pressure transducer 335 or other such pressure sensor disposed in the actuator supply line 329 between the pilot valve 340 and the actuator port 321, and connected with (e.g., by a wired or wireless connection) a system controller 360 (e.g., computer) proximate to or remote from the pressure transducer 335.

To actuate the valve 310, the pilot valve 340 is operated to open the actuator fluid source 350 to the actuator port 321, to supply pressurized actuator fluid to the actuator inlet port. This results in an initial increase in pressure in the actuator supply line 329, as measured by the pressure transducer 335. When the pressure in the actuator supply line is sufficient to overcome the actuator spring 322 biasing force and any resistance to actuation by the valve element 315 (e.g., valve stem operating torque, or diaphragm/bellows biasing forces), the actuator piston 323 is moved against the actuator spring 322 to the actuated position, causing a brief drop in the actuator inlet pressure due to the increased volume below (upstream from) the actuator piston. To return the valve 310 to the normal (e.g., biased closed) position, the pilot valve 340 is operated to vent or exhaust the pressurized actuator fluid in the actuator supply line 329 and below the actuator piston 323. When the pressure in the actuator supply line is reduced by an amount sufficient to allow the compressed actuator spring 322 to move the actuator piston 323 against the actuator fluid and against any resistance to actuation by the valve element 315 (e.g., valve stem operating torque, or diaphragm/bellows biasing forces), the actuator piston 323 is moved to the spring-biased position, causing a brief increase in the actuator inlet pressure due to the reduced volume below (upstream from) the actuator piston.

Figure 6:
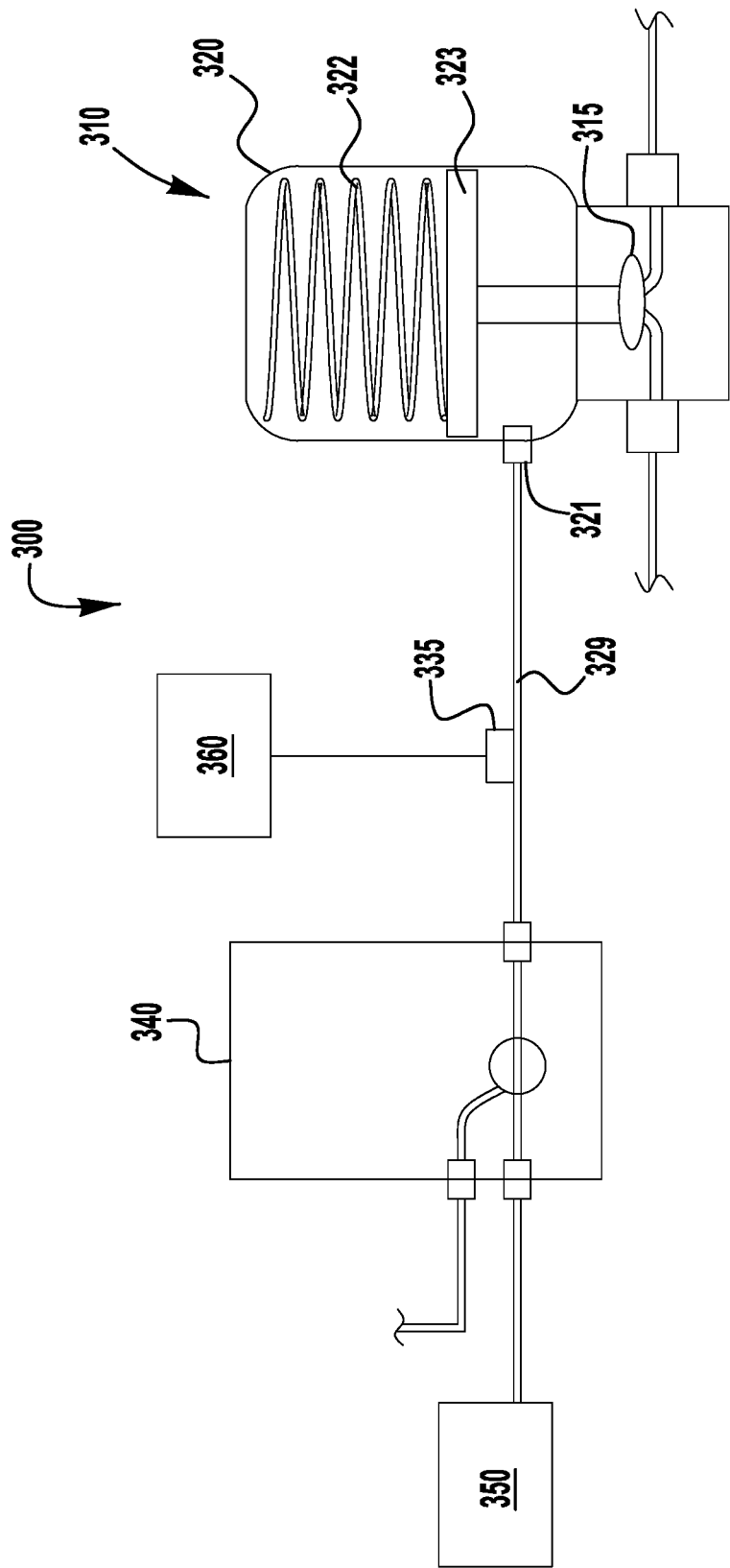
FIG. 6 is a schematic view of an actuated valve system, in accordance with another exemplary embodiment of the present disclosure.
Figure 7:
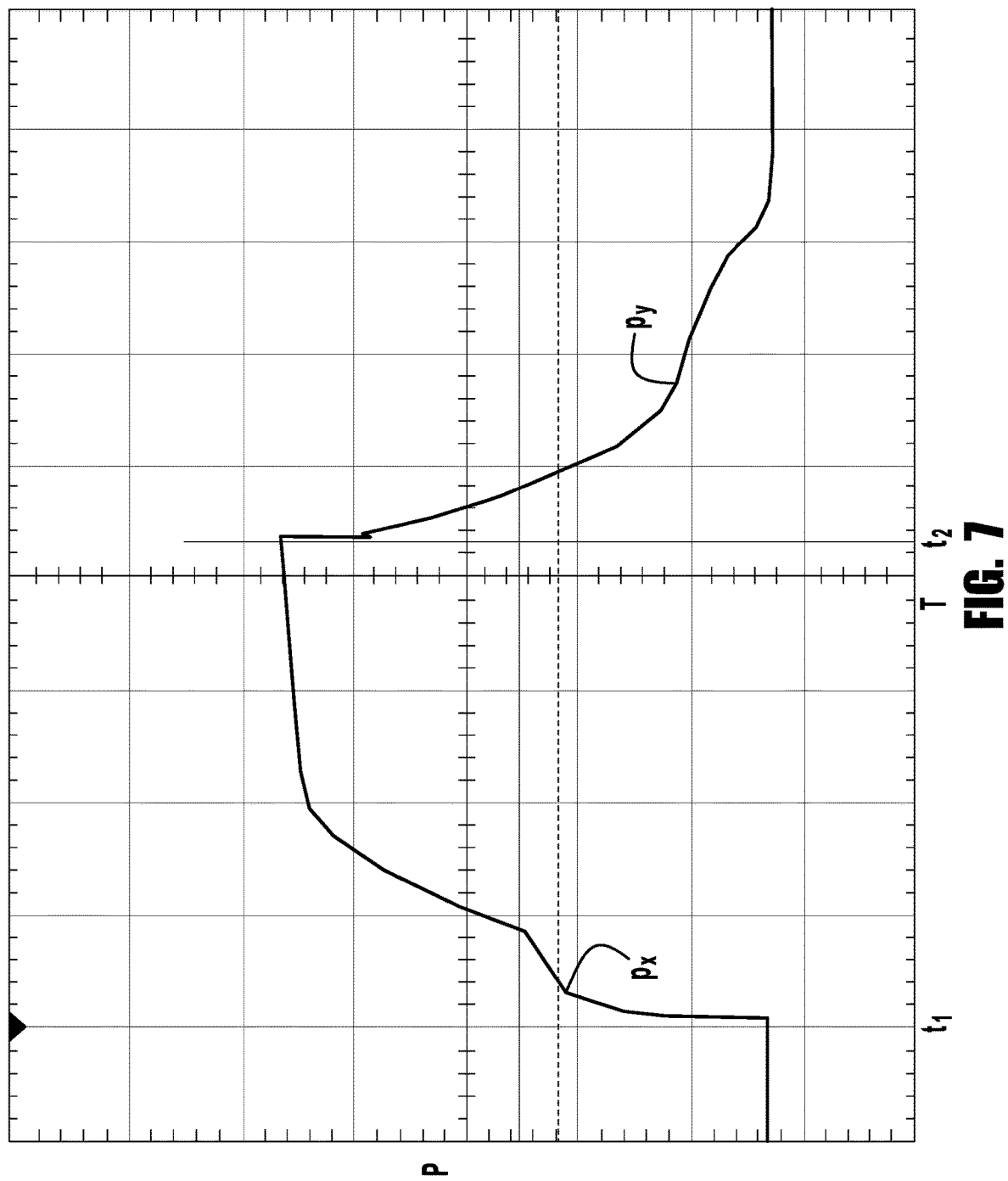
FIG. 7 is an exemplary valve cycle pressure profile of the actuated valve system of FIG. 6.

As shown in the valve cycle pressure profile of FIG. 7, and with reference to the schematic embodiment of FIG. 6, when the pressurized actuator fluid is initially supplied to a properly functioning actuator 320 on a properly functioning valve at time $t_1$ (e.g., by opening a pilot valve between the pressurized volume and the actuator), an inflection in the pressure profile or brief reduction in the rate of pressure increase (at $p_x$) during pressurization indicates an inlet pressure at which operation of the actuator (against actuator spring biasing and valve element resistance forces) is effected. This pressure inflection point $p_x$ can identify changes or deviations in actuator performance and/or valve element resistance (e.g., operating torque), for example, to identify conditions such as valve element galling, loss of lubricant, or seat clipping (as identified by an increase in the pressure inflection point $p_x$), or insufficient packing torque, actuator spring damage, or damaged diaphragm/bellows (as identified by a decrease in the pressure inflection point $p_x$). The time duration of the reduced rate of pressure increase can indicate the valve cycle time, which may provide further indication of actuation difficulties (e.g., due to increased valve actuation torque or gross actuator leakage). Furthermore, the absence of an inflection point $p_x$ during actuator pressurization may provide an indication that the valve failed to actuate.

As further shown in the valve cycle pressure profile of FIG. 7, when the pressurized actuator fluid is vented or exhausted from the valve actuator 320 at time $t_2$ (e.g., by switching the pilot valve to an exhaust/vent switching position) through the actuator supply line 329, an inflection in the pressure profile or brief reduction in the rate of pressure drop (at $p_y$) during depressurization indicates an inlet pressure at which the actuator spring force overcomes the inlet pressure and valve element resistance to actuation to effect operation of the actuator to the normal or biased position. This pressure inflection point $p_y$ can identify changes or deviations in actuator performance and/or valve element resistance (e.g., operating torque), for example, to identify conditions such as actuator spring damage, valve element galling, loss of lubricant, or seat clipping (as identified by a decrease in the pressure inflection point $p_y$), or insufficient packing torque or damaged diaphragm/bellows (as identified by an increase in the pressure inflection point $p_y$). The time duration of the reduced rate of pressure drop can indicate the valve cycle time, which may provide further indication of actuation difficulties (e.g., due to increased valve actuation torque or gross actuator leakage). Furthermore, the absence of an inflection point $p_y$ during actuator depressurization may provide an indication that the valve failed to actuate.

Figure 8:
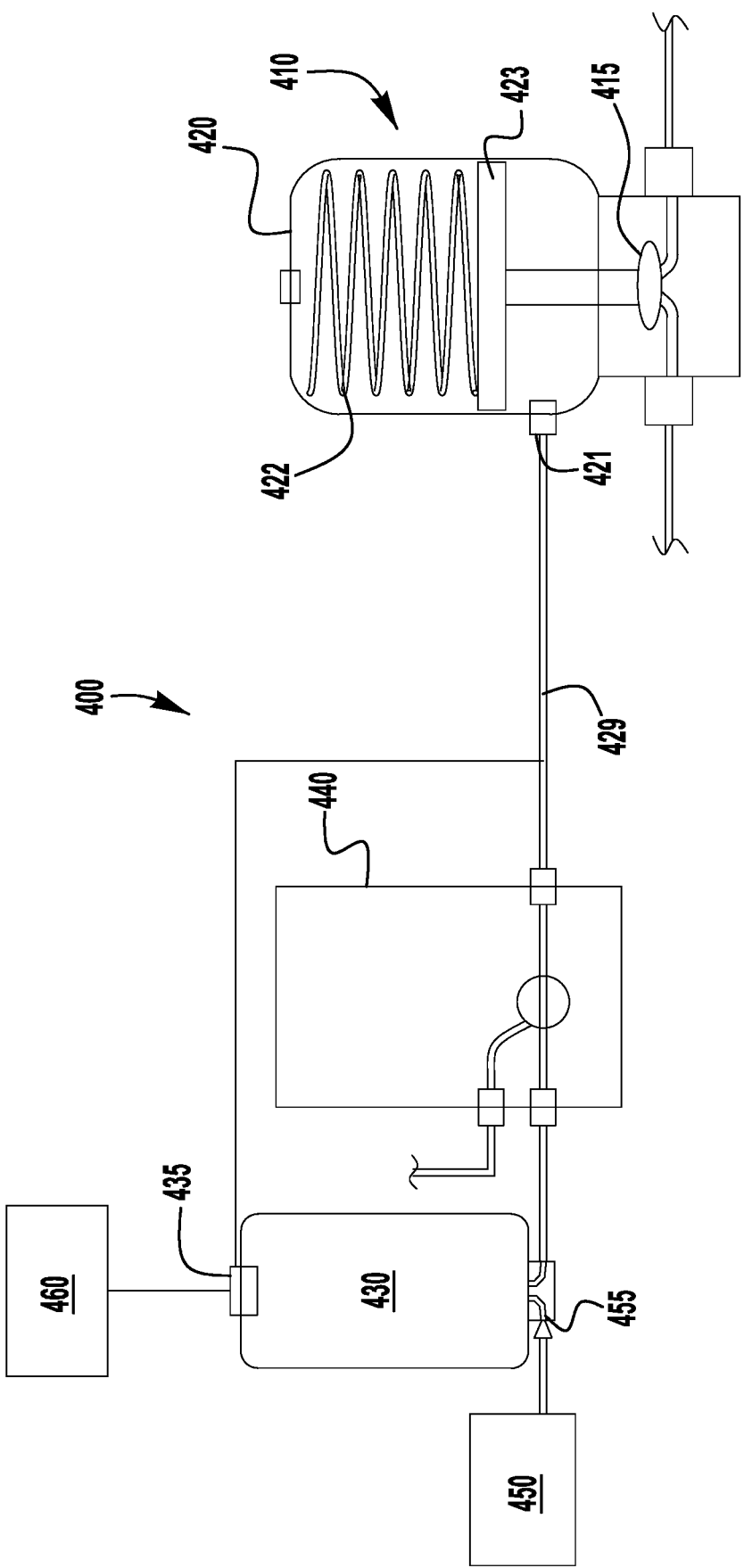
FIG. 8 is a schematic view of an actuated valve system, in accordance with another exemplary embodiment of the present disclosure.

According to another aspect of the present disclosure, a pressure transducer or other such pressure sensor may be configured to measure pressure differential between a pressurized volume or chamber of actuator fluid upstream of a pilot valve and the actuator supply line between the pilot valve and the actuator inlet. In an exemplary arrangement, as schematically shown in FIG. 8, an actuated valve system 400 includes a valve 410 having a pneumatically operated actuator 420 with an actuator port 421 connected to a pressurized chamber 430 (e.g., sample cylinder) by an actuator supply line 429 and pilot valve 440 (e.g., solenoid operated switching valve) or other supply valve, with the pressurized chamber 430 connected with an actuator fluid source 450. Flow between the actuator fluid source 450 and the pressurized chamber 430 may be limited using a reduced orifice or other flow restriction 455 to delay pressure increases within the chamber 430, such that the changes in chamber pressure resulting from valve actuation may be more easily measured. To actuate the valve 410, the pilot valve 440 is operated to open the pressurized chamber 430 to the actuator port 421, to supply pressurized actuator fluid from the chamber to the actuator inlet port. This results in a temporary decrease in pressure within the chamber 430, until the chamber is refilled by the actuator fluid source 450 and the pressure is restored.

Figure 9:
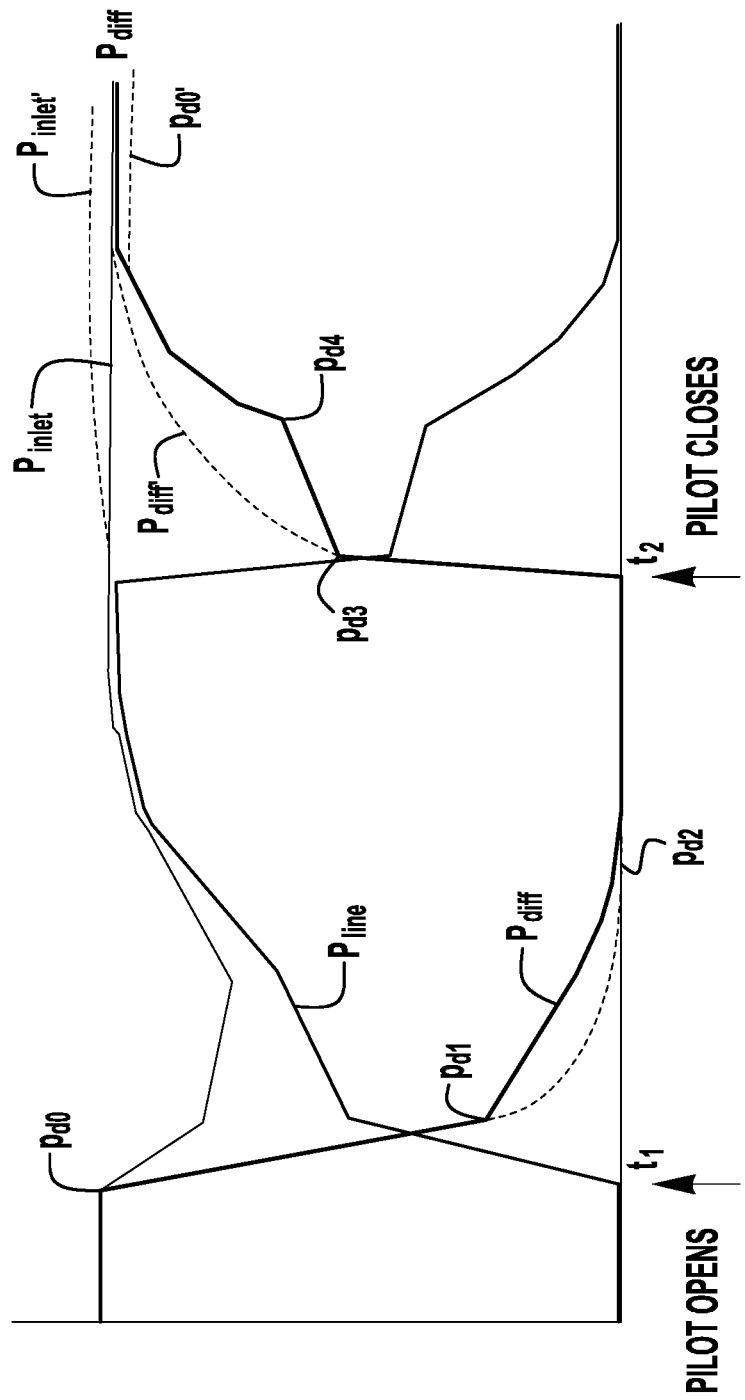
FIG. 9 is an exemplary valve cycle pressure profile of the actuated valve system of FIG. 8.

The chamber pressure $P_{inlet}$, the supply line pressure $P_{line}$, and the differential pressure $P_{diff}$ between the chamber 430 and the actuator supply line 429 is monitored by a pressure transducer 435, which may be connected with (e.g., by a wired or wireless connection) a system controller 460 (e.g., computer) proximate to or remote from the pressure transducer 435. As shown in the valve cycle pressure profile of FIG. 9, and with reference to the schematic embodiment of FIG. 8, when the pressurized actuator fluid is initially supplied to a properly functioning actuator 420 at time $t_1$ (e.g., by opening the pilot valve 440), the differential pressure $P_{diff}$, as measured by the pressure transducer 435, decreases from a set pressure differential $pd_0$ to a first reduced differential pressure $pd_1$, as the supplied fluid pressure builds on the actuator piston 423 to a pressure sufficient to move the piston (e.g., against a biasing spring 422 and/or valve element resistance). As the actuator piston 423 moves to the actuated position and the pressurized fluid fills a cavity 424 in the actuator 420 behind the piston, the pressure differential further decreases from the first reduced pressure differential $pd_1$ to a second reduced pressure $pd_2$, generally at a shallower or more gradual slope than the pressure differential change from set pressure differential $pd_0$ to first reduced pressure differential $pd_1$, until the pressure differential $pd_2$ approaches zero (with the actuator supply line pressure being substantially equal to the chamber pressure). To restore the pressure in the pressurized chamber 430, the actuator fluid source 450 supplies pressurized actuator fluid to the pressurized chamber, for example, as described above with regard to the embodiment of FIG. 2.

When the pilot valve is closed to return the actuated valve to the normal position at time $t_2$, the differential pressure pd increases from the second reduced pressure differential $pd_2$ to a third pressure differential $pd_3$ as the actuator 420 and actuator supply line 429 are vented or exhausted through the pilot valve 440 to reduce the actuator inlet pressure to a pressure low enough for the actuator biasing spring 420 to overcome (in combination with any valve element resistance). At this third pressure differential $pd_3$, spring biased movement of the actuator piston 423 to the normal or return position causes a slower, more gradual increase in the pressure differential to a fourth pressure differential $pd_4$, at which the piston has completed its return stroke, and the remainder of the actuator inlet pressure is vented, causing the pressure differential pd to return to the set pressure differential $pd_0$.

As with the above examples, information regarding the timing, duration, and pressure required for actuation may be determined by identifying the inflection points in the pressure differential curve corresponding to the identified pressure differentials $pd_1$, $pd_2$, $pd_3$, $pd_4$. Further, the absence of the inflection points, as shown in alternative differential pressure profile $P_{diff}'$, provides an indication that the actuator 420 has failed to actuate. Additionally, if there is a leak past the actuator piston 423 when the pilot valve 440 is open, closure of the pilot valve 440 will result in an increase in the upstream pressure (as shown at $P_{inlet}'$). If there is a leak past the pilot valve when the pilot valve is closed, the set pressure differential will be reduced (as shown at $pd_0'$).

According to another aspect of the present disclosure, an actuated valve may be provided with an actuator fluid supplying/venting pilot valve having a pressure retaining backpressure device (e.g., check valve, relief valve) connected with (e.g., directly or indirectly assembled or integrated with) an exhaust port of the pilot valve to maintain a nominal, non-actuating positive pressure on the actuator inlet when the actuator is in the normal (e.g., spring biased) position, to provide for identification of leakage past the actuator by a pressure transducer or other such pressure sensor disposed between the actuator inlet port and the backpressure device.

Figure 10:
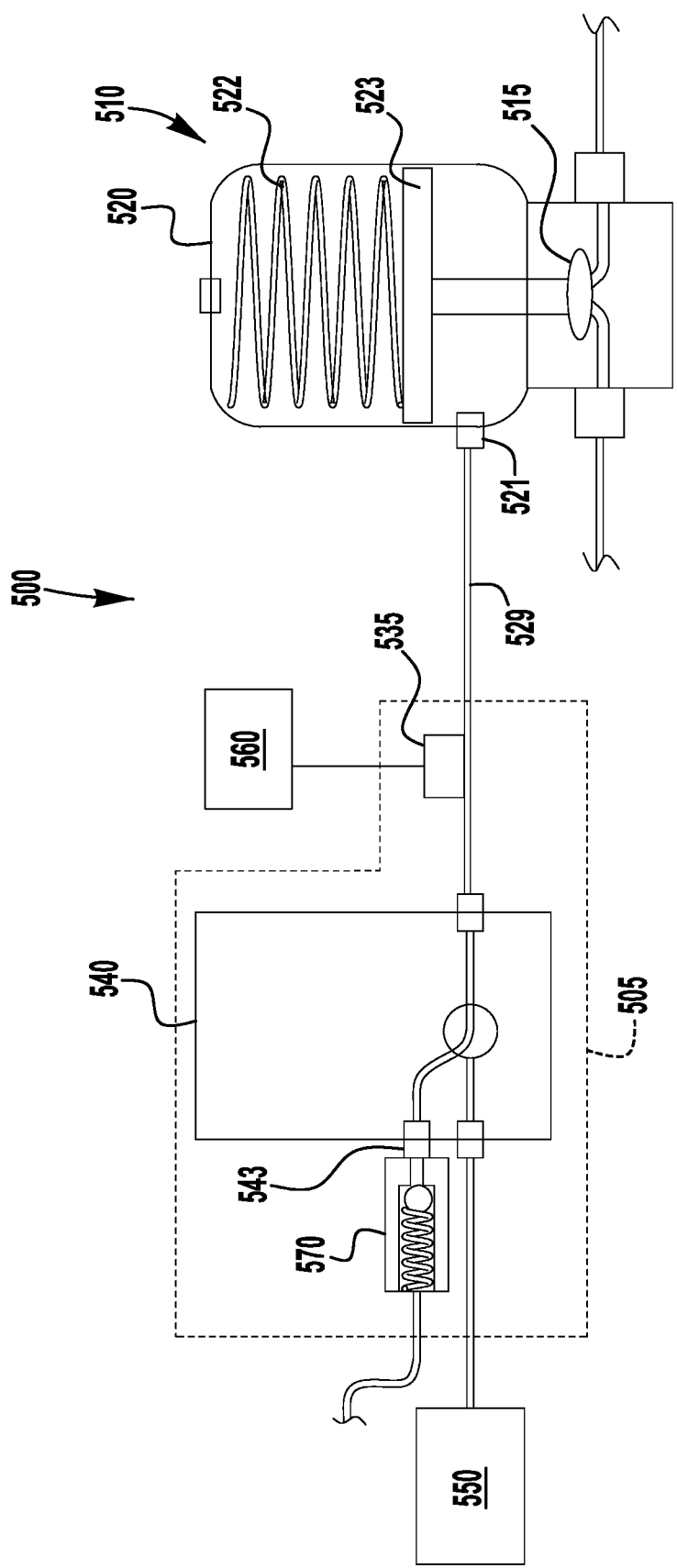
FIG. 10 is a schematic view of an actuated valve system, in accordance with another exemplary embodiment of the present disclosure.

In an exemplary arrangement, as schematically shown in FIG. 10, an actuated valve system 500 includes a valve 510 having a pneumatically operated actuator 520 with an actuator port 521 connected by an actuator supply line 529 to a pilot valve 540 downstream from an actuator fluid source 550, with a pressure transducer 535 connected with the actuator supply line 529 and a backpressure device 570 connected with (e.g., directly or indirectly assembled or integrated with) the exhaust port 543 of the pilot valve 540. When the actuated valve 510 is returned to the normal (e.g., biased closed) position, by operating the pilot valve 540 to vent or exhaust the pressurized actuator fluid in the actuator supply line 529 and below the actuator piston 523, the backpressure device 570 retains a nominal, non-actuating positive pressure (e.g., 5-10 psi) in the actuator supply line 529 and against the spring biased actuator piston 523. In such an arrangement, leakage of actuator fluid past the actuator piston 523 may be detected by a measured pressure decrease below the pressure setting of the backpressure device 570 by the pressure transducer 535 below the pressure setting of the backpressure device 570 while the pilot valve 540 is in the closed/exhaust position. In an exemplary embodiment, the pilot valve 540, pressure transducer 535, and backpressure device 570 may be provided together as an integrated assembly 505, for example, for ease of installation, reduction of system footprint, etc. Other system managing and/or monitoring components may also be provided in the integrated assembly, including, for example, a cycle counter, flowmeter, processor/controller, and/or output display (e.g., LED, LCD).

The arrangement of FIG. 10 may additionally provide indication of the timing, duration, and pressure conditions of operation of the valve actuator, by identifying the inflection points in the actuation pressure profile during pressurization and depressurization of the actuator 520, as shown and described above with respect to the embodiment of FIG. 6.

In the actuated valve arrangement of FIG. 10, in addition to leakage past the actuator 520, a decrease in pressure detected by the pressure transducer 535 may additionally or alternatively correspond to leakage past the pilot valve 540, and/or leakage past the backpressure device 570. In another embodiment, a pressure retaining backpressure device may be connected with (e.g., directly or indirectly assembled or integrated with) a supply port of a pilot valve, thereby excluding the effects of any leakage past the pilot valve from the transducer pressure detection. In such an arrangement, the backpressure device may be configured to permit bidirectional or two-way flow—forward flow of actuator fluid from the pilot valve to the actuator inlet during actuator pressurization (i.e., pilot valve open), and backpressure retaining reverse flow from the actuator supply line to the pilot valve during actuator depressurization (i.e., pilot valve closed).

Figure 11:
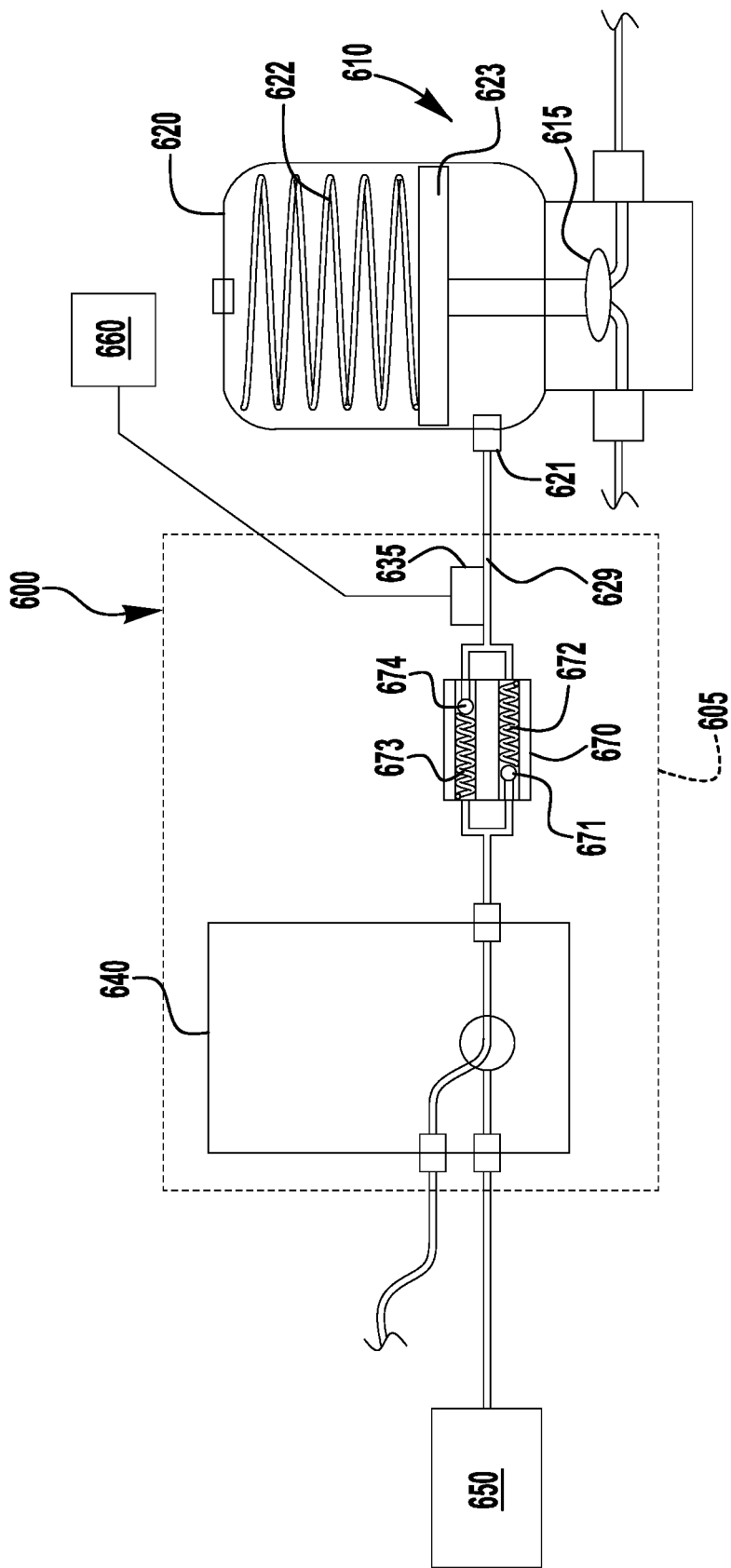
FIG. 11 is a schematic view of an actuated valve system, in accordance with another exemplary embodiment of the present disclosure.

In an exemplary arrangement, as schematically shown in FIG. 11, an actuated valve system 600 includes a valve 610 having a pneumatically operated actuator 620 with an actuator port 621 connected by an actuator supply line 629 to a pilot valve 640 downstream from an actuator fluid source 650, with a pressure transducer 635 and a bidirectional backpressure device 670 connected with (e.g., directly or indirectly assembled or integrated with) the supply port 642 of the pilot valve 640. The exemplary backpressure device 670 includes a supply passage 671 permitting forward or supply flow to the actuator supply line 629 but sealing against reverse flow from the actuator supply line (e.g., using a first check valve 672), and an exhaust passage 673 in parallel with the supply passage 671, permitting reverse/exhaust flow from the actuator supply line 629 while retaining a nominal, non-actuating back pressure (e.g., 5-10 psi) in the actuator supply line and against the spring biased actuator piston 623 (e.g., using a second check valve 674) when the actuated valve 610 is returned to the normal (e.g., biased closed) position. In such an arrangement, leakage of actuator fluid past the actuator piston 623 may be detected by a measured pressure decrease below the pressure setting of the backpressure device 670 by the pressure transducer 635 while the pilot valve 640 is in the closed/exhaust position. In an exemplary embodiment, any two or more of the pilot valve 640, pressure transducer 635, and backpressure device 670 may be provided together as an integrated assembly 605, for example, for ease of installation, reduction of system footprint, etc. Other system managing and/or monitoring components may also be provided in the integrated assembly, including, for example, a cycle counter, flowmeter, processor/controller, and/or output display (e.g., LED, LCD).

The arrangement of FIG. 11 may additionally provide indication of the timing, duration, and pressure conditions of operation of the valve actuator, by identifying the inflection points in the actuation pressure profile during pressurization and depressurization of the actuator 420, as shown and described above with respect to the embodiment of FIG. 6.

In some actuated valve systems, a backpressure device, as described herein, may perform additional functions. For example, the backpressure device may additionally or alternatively retain a non-actuating positive pressure against the actuator inlet port during the actuator return stroke, to apply a dampening force thus reducing the actuator output force in the normal, spring return condition. This reduced return force may, for example, reduce valve seat wear in a normally closed actuated valve. For such an arrangement, the backpressure setting may be greater than the 5-10 psi nominal setting described above, and may be selected to reduce the return force to a desired amount. However, such an arrangement may still be used in combination with the sensor systems and methods described above, by retaining a pressurized fluid in the actuator supply line to facilitate sensing of pressure changes during or after valve actuation. Exemplary backpressure arrangements for reducing actuator return force are described in the concurrently filed U.S. Provisional Application entitled "ACTUATED VALVE SYSTEMS WITH REDUCED ACTUATOR RETURN FORCE," the entire disclosure of which is incorporated herein by reference.

Figure 12:
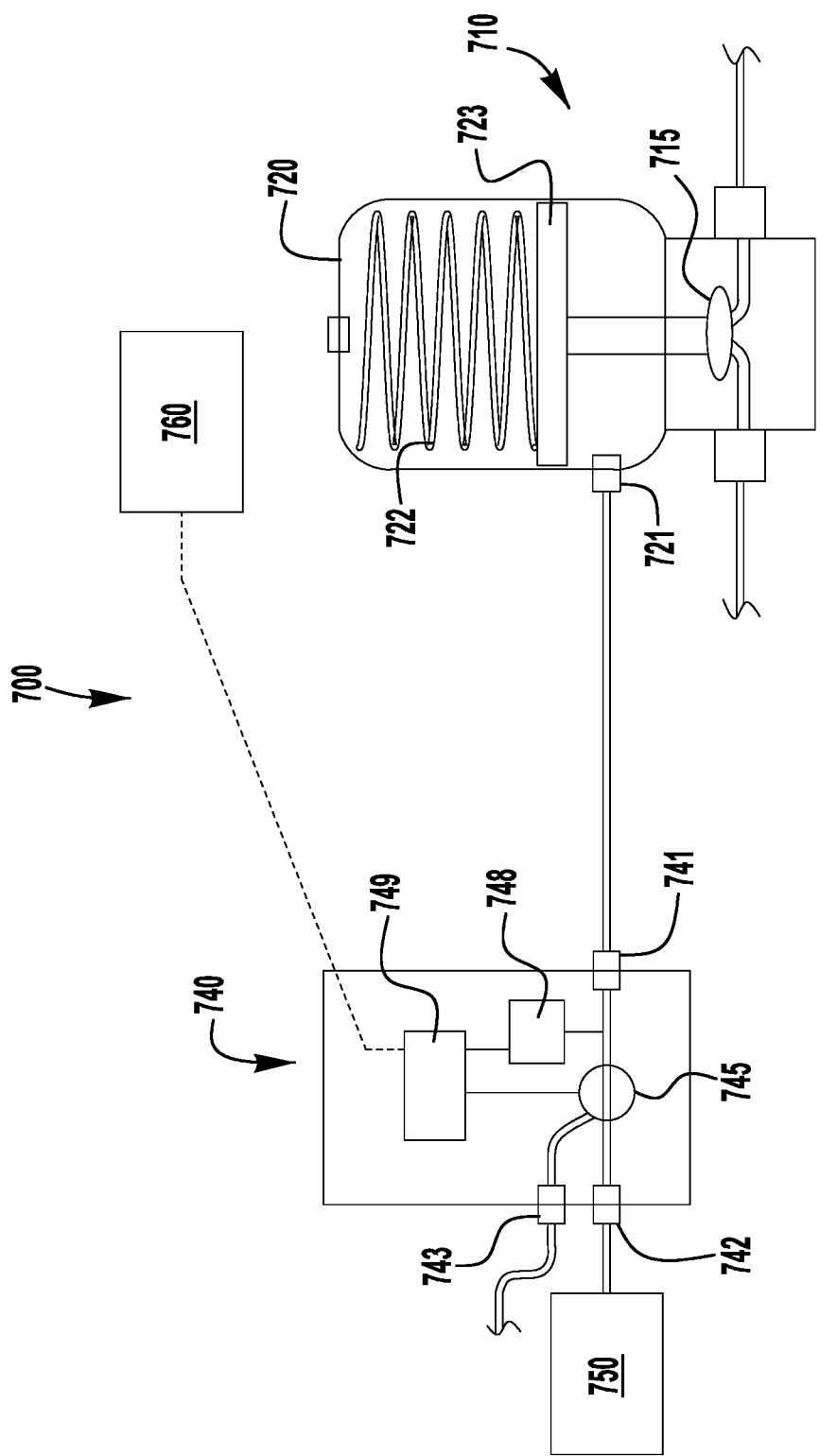
FIG. 12 is a schematic view of an actuated valve system, in accordance with another exemplary embodiment of the present disclosure.

According to another aspect of the present disclosure, an actuated valve system may be provided with a valve control module configured to control actuation fluid supply to, and exhaust from, the valve actuator while monitoring the pressure in the actuator supply line. In one such exemplary arrangement, as schematically illustrated in FIG. 12, an actuated valve system 700 includes a valve 710 having a pneumatic actuator 720, and a valve control module 740 having an actuation port 741 connected with an actuator inlet port 721 of the actuator 720, a pressurization port 742 connected with an actuator fluid source 750, and an exhaust port 743 for venting pressurized actuation fluid. The valve control module 740 includes a pilot valve arrangement 745 connecting the actuation port 741 with the pressurization port 742 and the exhaust port 743, a fluid sensor 748 measuring a fluid condition (e.g., pressure) between the pilot valve arrangement 745 and the actuator inlet port 721, and a controller 749 in circuit communication with the sensor 748 and with the pilot valve arrangement 745 for operation of the pilot valve arrangement to the first, second and third conditions.

The exemplary pilot valve arrangement 745 is operable, by operation of the controller 749, between first, second, and third conditions. In the first condition, the pilot valve arrangement 745 permits flow between the pressurization port 742 and the actuation port 741 and blocks flow between the actuation port and the exhaust port 743 to pressurize the actuator inlet port 721, for example, for operation of the actuator 720 and movement of the valve element 715 to an actuated (e.g., open) position. In the second condition, the pilot valve arrangement 745 blocks flow between the pressurization port 742 and the actuation port 741 and permits flow between the actuation port and the exhaust port 743 to vent the actuator inlet port 721. Where the actuator 720 is a single acting (e.g., spring biased) actuator, this venting of the pressurized actuator inlet port 721 allows the actuator to move the valve element 715 to a return (e.g., closed) position. In the third condition, the pilot valve arrangement 745 blocks flow between the pressurization port 742 and the actuation port 741 and blocks flow between the actuation port and the exhaust port 743, to capture pressurized fluid in the actuator inlet port 721.

Figure 12A:
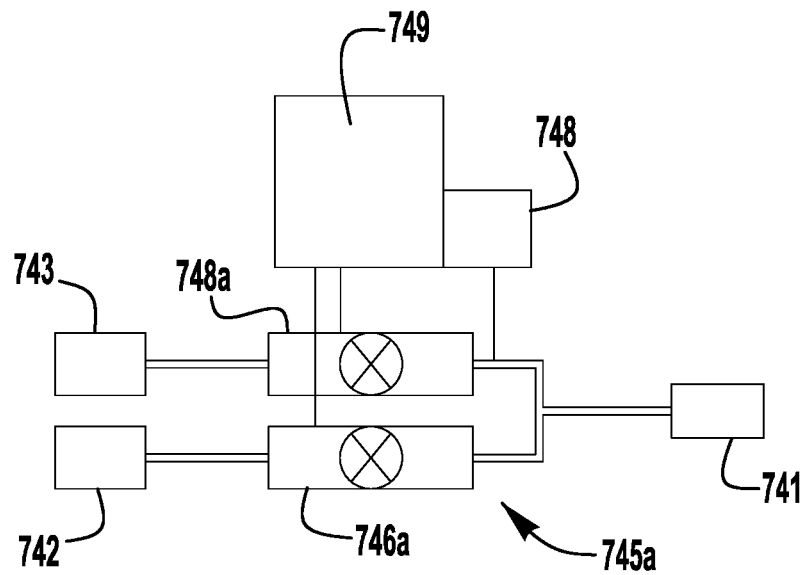
FIG. 12A is a schematic view of a pilot valve arrangement, in accordance with another exemplary embodiment of the present disclosure.

Many different pilot valve arrangements may be utilized to provide the first, second and third conditions described above. In one exemplary embodiment, as shown in FIG. 12A, a pilot valve arrangement 745a includes a first shutoff valve 746a connecting the pressurization port 742 with the actuation port 741, and a second shutoff valve 748a connecting the exhaust port 743 with the actuation port 741. In the first condition, the first shutoff valve 746a is open and the second shutoff valve 748a is closed to pressurize the actuator inlet port 721. In the second condition, both the first and second shutoff valves 746a, 748a are closed to capture pressurized fluid between the pilot valve arrangement 745a and the actuator inlet port 721. In the third condition, the first shutoff valve 746a is closed and the second shutoff valve 748a is open to vent the actuator inlet port 721. In one such embodiment, the first shutoff valve 746a is a normally closed solenoid valve and the second shutoff valve 748a is a normally open solenoid valve, such that in the event of lost power, the first shutoff valve returns to the closed position and the second shutoff valve returns to the open position, allowing the normally closed actuator 720 to return the valve element 715 to the closed position.

Figure 12B:
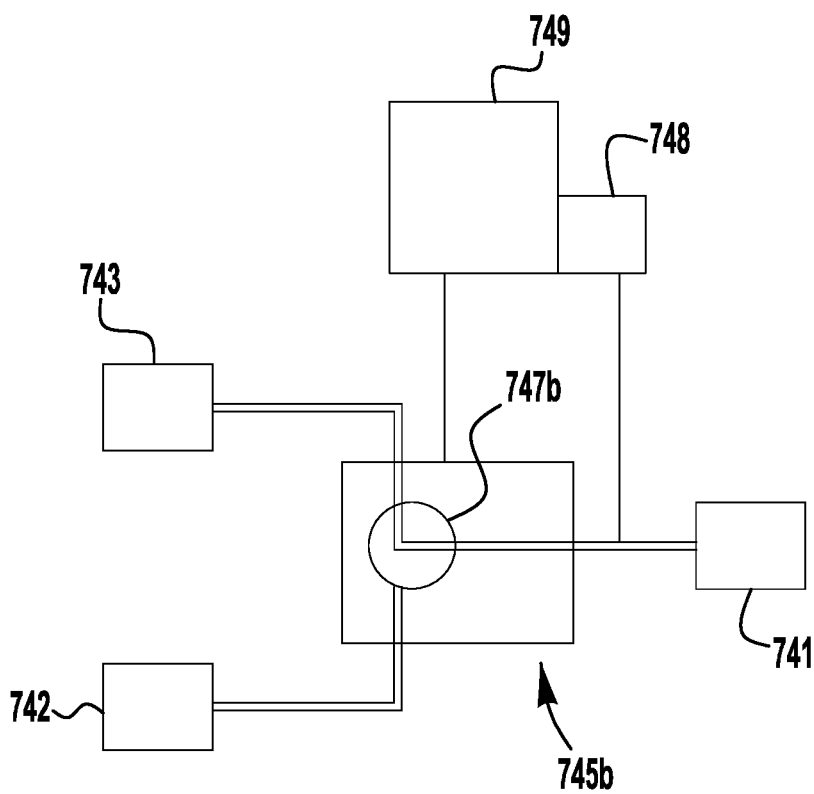
FIG. 12B is a schematic view of another pilot valve arrangement, in accordance with another exemplary embodiment of the present disclosure.

In another exemplary embodiment, as shown in FIG. 12B, a pilot valve arrangement 745b includes a three-position, three-way switching valve 747b having a first switching position, corresponding to the first condition, opening the pressurization port 742b to the actuation port 741b and blocking flow to the exhaust port 743b, a shutoff position, corresponding to the second condition, blocking flow between the actuation port 741b and both the pressurization and exhaust ports 742b, 743b, and a second switching position, corresponding to the third condition, opening the actuation port 741b to the exhaust port 743b and blocking flow from the pressurization port 742b. In one such embodiment, the switching valve 747b is configured to fail to the second switching position (the position shown in FIG. 12B), such that in the event of lost power, the normally closed actuator 720 returns the valve element 715 to the closed position.

According to an aspect of the present disclosure, the pilot valve arrangement 745 may be selectively operated between the first, second, and third conditions to increase (using the first condition), decrease (using the second condition), and/or maintain (using the third condition) the actuator inlet pressure, with the sensor 748 monitoring the pressure in real time to control such pressure adjustments. In an exemplary application, the pilot valve(s) may be rapidly actuated or pulsed to increase or decrease actuator inlet pressure, with the pressure sensor 748 providing instantaneous feedback used by the controller 749 to further pulse the pilot valve(s) for further adjustment of the actuator inlet pressure. In one such exemplary embodiment, the pilot valve arrangement 745a, 745b is configured to provide a fill or pressurization pulse duration between approximately 2 ms and approximately 10 ms to begin the actuation cycle, and an exhaust pulse duration between approximately 3 ms and approximately 10 ms, at a cycle time between approximately 200 ms and approximately 10,000 ms, with the pilot valve arrangement 745a, 745b being maintained in the third (pressure maintaining) condition and the pressure sensor 748 monitoring actuator inlet pressure between pulses. Based on feedback to the controller 749 (e.g., from the pressure sensor 748), to increase or decrease the rate at which the captured pressure is adjusted, the controller may adjust the pulse duration and pulse frequency of the first (pressurization) and second (exhaust) conditions.

In an exemplary application, a non-actuating positive pressure may be captured, such that the valve control module 740 functions as a backpressure device, similar to the embodiments of FIGS. 10 and 11, described in greater detail above. This non-actuating positive pressure may be provided, for example, for monitoring of the captured pressure to detect and/or quantify leakage past the actuator, as described in greater detail above.

As another example, a non-actuating positive pressure may be used to apply a dampening force against the actuator inlet port to reduce the actuator output force in the spring return condition, for example, to minimize deformation and/or wear (and resulting particle generation) of the valve seat during closing actuation of the valve. This reduced closing force may effectively extend the cycle performance of the valve by minimizing seal damage due to repetitive actuation. In applications requiring both frequent cycling and high integrity sealing during shutoff (e.g., non-cycling) conditions, the dampening actuator inlet pressure may be selectively or automatically removed or exhausted to provide for increased actuator closing force as needed.

As yet another example, a non-actuating positive pressure may additionally or alternatively be used to facilitate a quicker forward stroke actuation of the valve, as the positive, non-actuating actuator inlet port pressure can be increased to an actuating pressure more quickly, as compared to increasing the actuator inlet port pressure from atmospheric pressure.

Additionally or alternatively, control and/or monitoring of a captured actuating pressure (i.e., pressure sufficient to at least partially actuate the valve) between the pilot valve arrangement and the actuator inlet port may be used in a variety of applications. For example, sensor monitoring of the captured actuator inlet port pressure may be used to identify timing and/or duration of valve actuation, or the pressure at which the valve actuates, as described in greater detail above. This monitoring of the actuator inlet pressure profile over time may identify potential issues such as increases or decreases in required actuation force (e.g., corresponding to changes in actuation torque of a rotary valve or axial movement bellows or diaphragm valve element), actuator leakage, actuator sticking, or other conditions. The controller 749 may be programmed to compensate for deviations that are within an acceptable range (e.g., by increasing or decreasing captured actuator inlet port pressure), and/or to provide an alert when the measured actuator inlet pressure profile indicates valve system maintenance is required.

As another example, a captured actuator inlet pressure may be controlled to apply to the actuator a desired actuator inlet pressure that is less than the full fluid pressure of the actuator fluid source 750, but still sufficient to at least partially actuate the valve. This reduced actuation pressure may, for example, provide for slower actuation of the valve (i.e., a "soft start") for example, for controlled opening in applications sensitive to flow surges in a normally closed valve, or to reduce the valve closing force in a normally open valve. As another example, a reduced actuation pressure may provide for quicker return stroke actuation of the valve, as the reduced actuator inlet port pressure exhausts more quickly (and is more quickly overcome by the spring force) than would a fully pressurized actuator inlet port. As still another example, the actuator inlet pressure may be precisely controlled to provide for incomplete or partial actuation of the actuator, for example, to limit or regulate flow through the valve.

According to another aspect of the present disclosure, an actuator may be further adapted to facilitate monitoring and control of the actuated valve system by a captured actuation pressure. As one example, the actuator 720 may be provided with high flow capacity actuator porting to increase flow rates during pressurization and/or depressurization/exhaust of the actuator, for example, to facilitate quick forward stroke and/or return stroke actuation, and/or reduced pressurization and/or depressurization/exhaust time (e.g., reduced pulse durations) to allow more time for pressure sensing and feedback and controller analysis and actuation adjustment between pulses.

As another example, the spring return actuator 720 may be provided with a biasing spring arrangement having an increased spring rate (e.g., by providing a stiffer spring 722 and/or additional springs, in parallel and/or in series) such that one or more partial flow positions may more predictably correspond with one or more predetermined applied actuator inlet pressures. As one example, the spring return actuator 720 may be provided with a spring rate (e.g., lbs/in) that is greater than about five times the spring force (e.g., lbs) in the closed position, as compared to a conventional valve actuator spring rate of less than three times the spring force in the closed position. This increased spring rate may provide significant, measurable, and predictable differences in actuator pressure required to move the actuator piston 722 and valve element 715 to one or more incremental positions between the normal position and the actuated (e.g., open) position of the valve. In an exemplary embodiment with a biasing spring that closed the actuator, the spring rate is such that the actuator pressure required to move the actuator piston and valve element from the closed position to the open position is at least 50% greater than the actuator pressure required to begin the actuator stroke from the closed position (the "base actuation pressure"). Accordingly, with a base actuation pressure of X (e.g., 50 psi), incremental actuated positions between the fully closed and fully open valve positions may be calibrated at a range of actuation pressures between X (50 psi) and at least 1.5X (75 psi). In one such example, the actuator pressure required to move the actuator member and valve element to a midpoint position of the valve element between the normal (closed) and actuated (open) positions is at least about 30% greater than the actuator pressure required to begin the actuator stroke from the normal position (e.g., at least about 65 psi in the above example). In embodiments utilizing a biasing spring arrangement having an increased spring rate, a non-actuating backpressure (as described herein) may be applied to the actuator during the return stroke to dampen the return stroke prevent the biasing spring arrangement from applying excessive closing forces to the valve seat.

According to an exemplary aspect of the present disclosure, the actuated valve system 700 may be monitored and controlled using the single pressure sensor 748 within the valve control module 740. The controller 749 may be programmed with a number of known system parameters (e.g., actuator stroke, actuator volume displacement, fluid pressure, fluid temperature, spring rate), such that pressure sensor 748 feedback to the controller 749, combined with this programmed system information, may be used to calculate actuation pressure, actuation speed, closing force, and other such operating conditions, and to make suitable adjustments to the pulsing or other such operation of the pilot valve arrangements 745 to achieve desired flow control performance.

In other embodiments, additional system sensors may provide data regarding one or more system parameter to the controller to further facilitate desired adjustments to flow control and system performance. For example, a fluid temperature sensor may provide feedback to the controller 749 to identify a high fluid temperature condition, and the controller may adjust operation of the valve to reduce valve closing force (e.g., by increasing backpressure against the actuator return stroke, as described above). This arrangement may allow the actuated valve system to be used over a larger temperature range. As another example, a fluid pressure sensor or flowmeter may provide feedback to the controller 749 regarding fluid flow conditions, and the controller may adjust operation of the valve to increase or reduce fluid flow accordingly (e.g., by adjusting a partially open condition of the valve, by adjusting durations during which the valve is open, etc.).

The controller 749 may be connected with (e.g., by a wired or wireless connection) a system controller 760 (e.g., computer) proximate to or remote from the valve control module 740. The system controller 760 may include circuitry (e.g., microprocessor) for analyzing the measured changes in the fluid flow conditions to verify normal operating conditions or to identify non-compliant system conditions, and to generate communications (e.g., email, text message, etc.) alerting users of such conditions.

In addition to arrangements in which actuator inlet pressure is controlled to limit the closing force of an actuated valve, the present application also contemplates other systems and methods for providing a reduced force return stroke for an actuated valve assembly, for example to reduce closing forces between a valve element (e.g., diaphragm, poppet) and a valve seat seal. While exemplary embodiments in the application relate to spring biased pneumatic actuator assembled with linearly actuated valves (e.g., diaphragm valves), the features and aspects described in the present application may additionally or alternatively be applied to other types of actuators (e.g., hydraulic or other fluid driven actuators, non-spring biased actuators, double acting actuators), other types of valves (e.g., rotary valves, gate valves, etc.), and other types of pressurized fluid applications.

Figure 13:
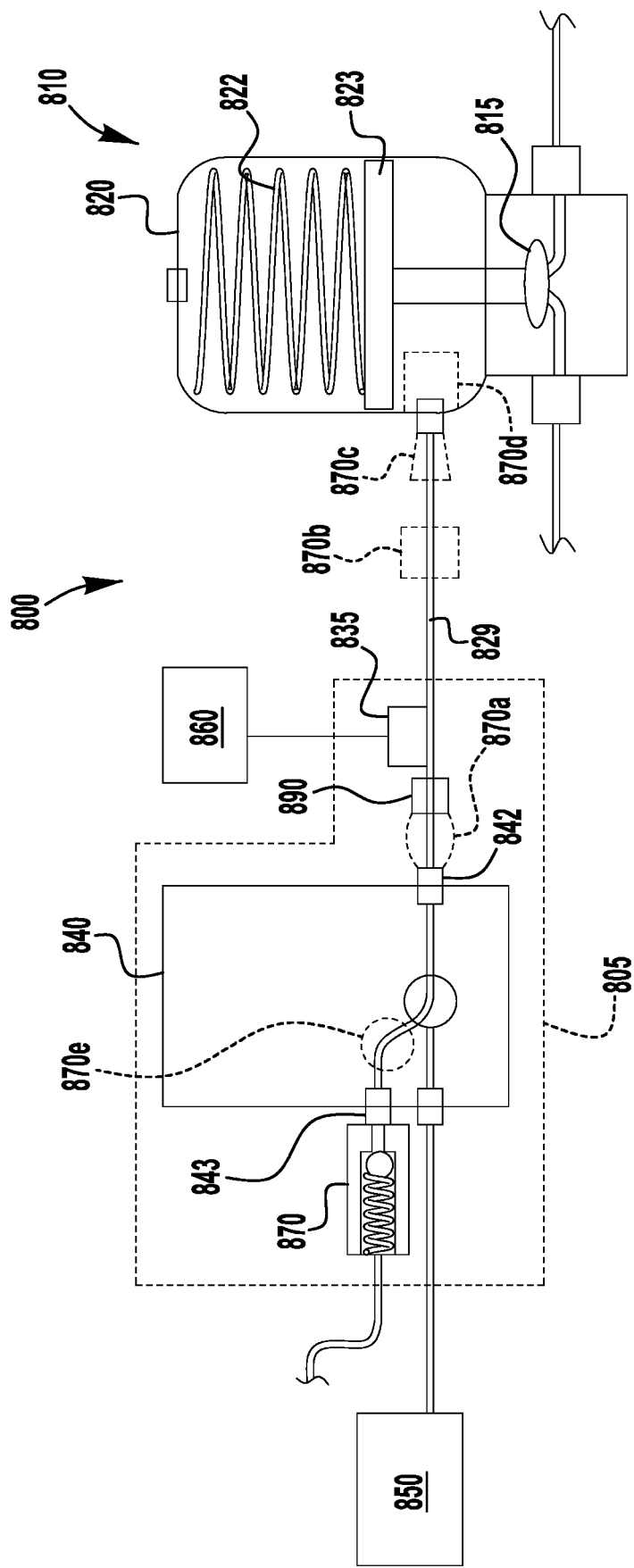
FIG. 13 is a schematic view of an actuated valve system, in accordance with an exemplary embodiment of the present application.

FIG. 13 schematically illustrates an actuated valve system 800 including a valve 810 having a fluid flow controlling valve element 815 (e.g., valve stem, diaphragm) operatively connected with a fluid operated (e.g., pneumatic) actuator 820 with an actuator port 821 connected to an actuator fluid source 850 by an actuator supply line 829 and a pilot valve 840 (e.g., solenoid operated switching valve) or other supply valve. In other embodiments, the pilot valve may be assembled directly to the actuator port, without use of a separate supply line. To move the valve element 815, the pilot valve 840 is moved to a first switching position to open the actuator fluid source 850 to the actuator port 821. This results in fluid flow through the actuator supply line and an increase in pressure in the actuator port 821, and against a fluid driven actuator member 823 (e.g., one or more pistons) within the actuator. When a minimum actuating pressure is supplied to the actuator port, the resulting actuating force on the actuator member 823 overcomes a biasing force applied by a biasing member 822 (e.g., one or more springs) within the actuator, and any resistance to actuation of the valve element 815 (e.g., friction, valve packing load, valve fluid pressure, etc.) to move the actuator member 823 from the first, normal or return position to the second, actuated position. The actuator member 823 is directly or indirectly connected with the valve element 815 to correspondingly move the valve element from the normal position (e.g., a valve closed or shutoff position) to the actuated position (e.g., valve open or fluid flow position).

To return the valve element 815 to the normal position, the pilot valve 840 is moved to a second switching position to vent or exhaust the pressurized actuator fluid in the actuator supply line 829 and upstream of the actuator member 823. The biasing force applied to the actuator member 823 by the biasing member 822 moves the actuator member 823 against the venting actuator fluid and against any resistance to actuation by the valve element 815 to the normal or return position, thereby moving the valve element 815 to the corresponding normal position.

According to an exemplary aspect of the present application, to reduce return stroke forces applied by the actuator 820, the actuated valve system 800 may be provided with a backpressure arrangement 870 (e.g., a spring loaded or otherwise biased check valve, or a relief valve) in fluid communication with the actuator inlet port 821 to retain a non-actuating positive pressure (i.e., smaller than the minimum actuating pressure) against the actuator member 823 when the pilot valve 840 is moved to the second position. The non-actuating positive pressure applies a dampening force against the actuator member 823 and counter to the biasing force of the biasing member to produce a net return force smaller than the biasing force, but still sufficient to return the valve element 815 from the actuated position to the normal position. The non-actuating positive pressure, and the corresponding net return force, may be selected, for example, to provide a desired actuation speed and closing force for the particular application. In an exemplary embodiment, the non-actuating positive pressure may be about 10%-90%, or about 40%-60%, or about 50% of the minimum actuating pressure, and the net return force may be about 10%-90%, or about 40%-60%, or about 50% of the spring biasing force. Such an arrangement, maintaining a base, non-actuating positive pressure against the actuator member, may additionally provide for quicker pressurized actuation of the valve actuator, as the pressure in the actuator supply line, actuator inlet, and actuator piston chamber will be pressurized from the non-actuating positive pressure, rather than from a fully vented, atmospheric pressure.

Figure 14:
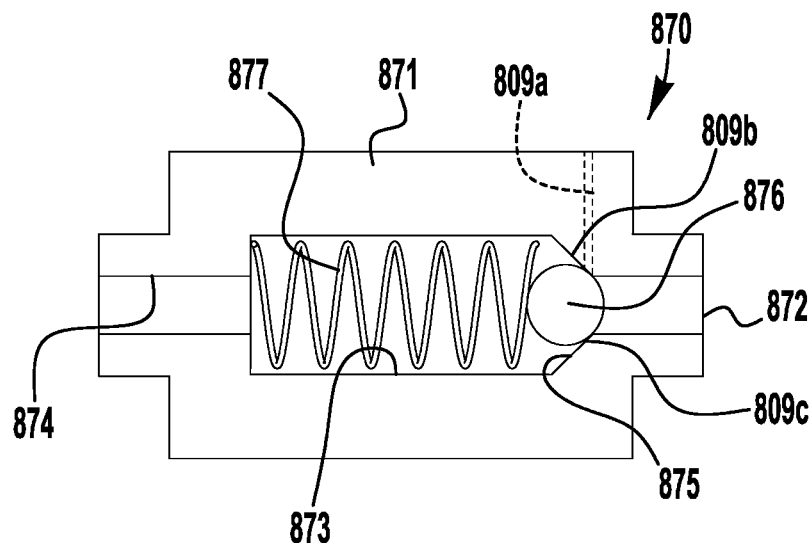
FIG. 14 is a schematic cross-sectional view of a backpressure device, in accordance with another exemplary embodiment of the present application.

In the illustrated embodiment of FIG. 13, the backpressure arrangement includes a backpressure device 870 assembled with the pilot valve exhaust port 843. The exemplary backpressure device 870, as shown in FIG. 14, includes a check valve or relief valve type arrangement, with a body 871 having a passage 873 extending from a first port 872 to a second port 874, with a seat 875 disposed in the passage. A seal member 876 (e.g., a ball or plug) is disposed in the passage 873 and is biased (e.g., by spring 877) into sealing engagement with the seat 875. The seal member separates from the seat at a set inlet port pressure (or "cracking pressure") to release through the second port 874 any excess pressure greater than the set pressure, thereby maintaining the desired non-actuating positive pressure upstream of the backpressure arrangement 870 at the actuator inlet port.

In other embodiments, the backpressure arrangement may be provided in a variety of other locations in the actuated valve system 800, including, for example, assembled with the pilot valve supply port 842 (schematically in FIG. 13 at 870*a*), installed in the actuator supply line 829 (schematically at 870*b*), assembled with the valve actuator inlet port 821 (schematically at 870*c*), integrated with the valve actuator 820 (schematically at 870*d*), and integrated with the pilot valve 840 (schematically at 870*e*).

Figure 15:
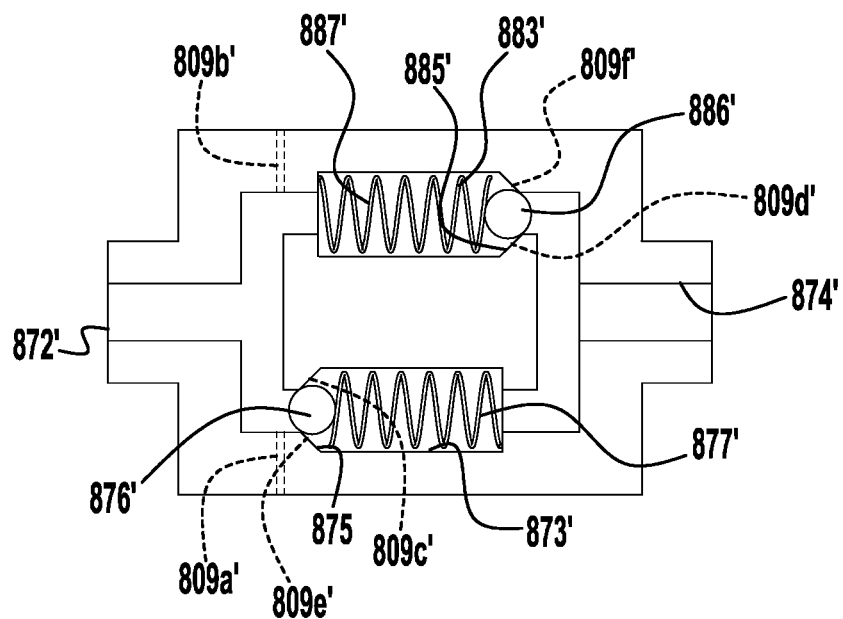
FIG. 15 is a schematic cross-sectional view of a backpressure device, in accordance with another exemplary embodiment of the present application.

In some arrangement, as shown at 870*a*, 870*b*, 870*c*, and 870*d*, the backpressure arrangement receives both pressurizing actuator fluid (during actuator pressurization) and venting actuator fluid (during actuator depressurization). In such an arrangement, the backpressure device 870', as shown in FIG. 15, may include both a first, supply passage 883', permitting forward or supply flow to the actuator supply line but sealing against reverse flow from the actuator supply line, and a second, exhaust passage 873' in parallel with the supply passage 883', permitting reverse/exhaust flow from the actuator supply line while retaining a nominal, non-actuating back pressure, as described above. While many different configurations may be utilized, in one embodiment, the backpressure device 870' may include an exhaust flow check/relief valve arrangement, as shown in FIG. 14 and described above, in parallel with a supply flow check/relief valve having a supply seal member 886' (e.g., a ball or plug) disposed in the supply passage 883' and biased (e.g., by spring 887') into sealing engagement with a supply seat 885', to block reverse flow through the supply passage while permitting forward, pressurizing flow through the supply passage.

According to another exemplary aspect of the present application, a backpressure arrangement for retaining a positive non-actuating pressure against an actuator inlet may be provided with a depressurization mechanism to reduce or eliminate the retained positive non-actuating pressure, such that the net return force of the actuator increases. In "normally closed" actuated valve embodiments, such an arrangement may allow for softer or lighter return stroke valve shutoff during rapid or frequent valve cycling, while allowing for increased valve sealing force during extended shutoff periods where high integrity valve shutoff may be desired (e.g., system shutdown/maintenance). In one embodiment, as shown schematically in FIG. 13, a backpressure arrangement may include a vent/purge valve 890 directly or indirectly connected with the actuator supply line 829 and selectively operable to release the retained pressure in the actuator supply line, thereby increasing the net return force of the actuator.

In another embodiment, the backpressure arrangement may include a controlled or engineered leak path configured to allow the positive pressure to bleed or reduce over time, such that the net return force of the actuator automatically increases when the actuator is maintained in the normal, non-actuated position for a time period greater than a standard valve cycle period during valve cycling. For example, where an actuated valve is typically cycled every 0.5 to 10 seconds, an engineered leak path may provide a leak rate sufficient to substantially eliminate the non-actuation positive pressure in about 30-60 seconds. In an exemplary embodiment, an engineered leak path may be sized or configured to provide a leak rate between about 0.25 sccm and 2.5 sccm under pneumatic pressures of about 25 psi to 40 psi.

An engineered leak path may be provided in a variety of locations in the actuated valve system, including, for example, any one or more of the pilot valve, the actuator supply line, the actuator, and the backpressure device. In the exemplary backpressure device 870 of FIG. 14, an engineered leak path may, for example, be provided in one or more of the body 871 (e.g., a pinhole leak port intersecting the passage 873, at 809*a*), the seat 875 (e.g., a groove, notch, or other such feature, at 809*b*), and the seal member 876 (e.g., a groove, notch, or other such feature, at 809*c*). In the exemplary backpressure device 870*a* of FIG. 15, an engineered leak path may, for example, be provided in one or more of the body 871' (e.g., a pinhole leak port intersecting the exhaust passage 873', at 809*a'*, or the supply passage 883', at 809*b'*), the exhaust valve seat 875' (e.g., a groove, notch, or other such feature, at 809*c'*), the supply valve seat 885' (e.g., a groove, notch, or other such feature, at 809*d'*), the exhaust valve seal member 876' (e.g., a groove, notch, or other such feature, at 809*e'*), and the supply valve seal member 886' (e.g., a groove, notch, or other such feature, at 809*f'*).

Figure 16:
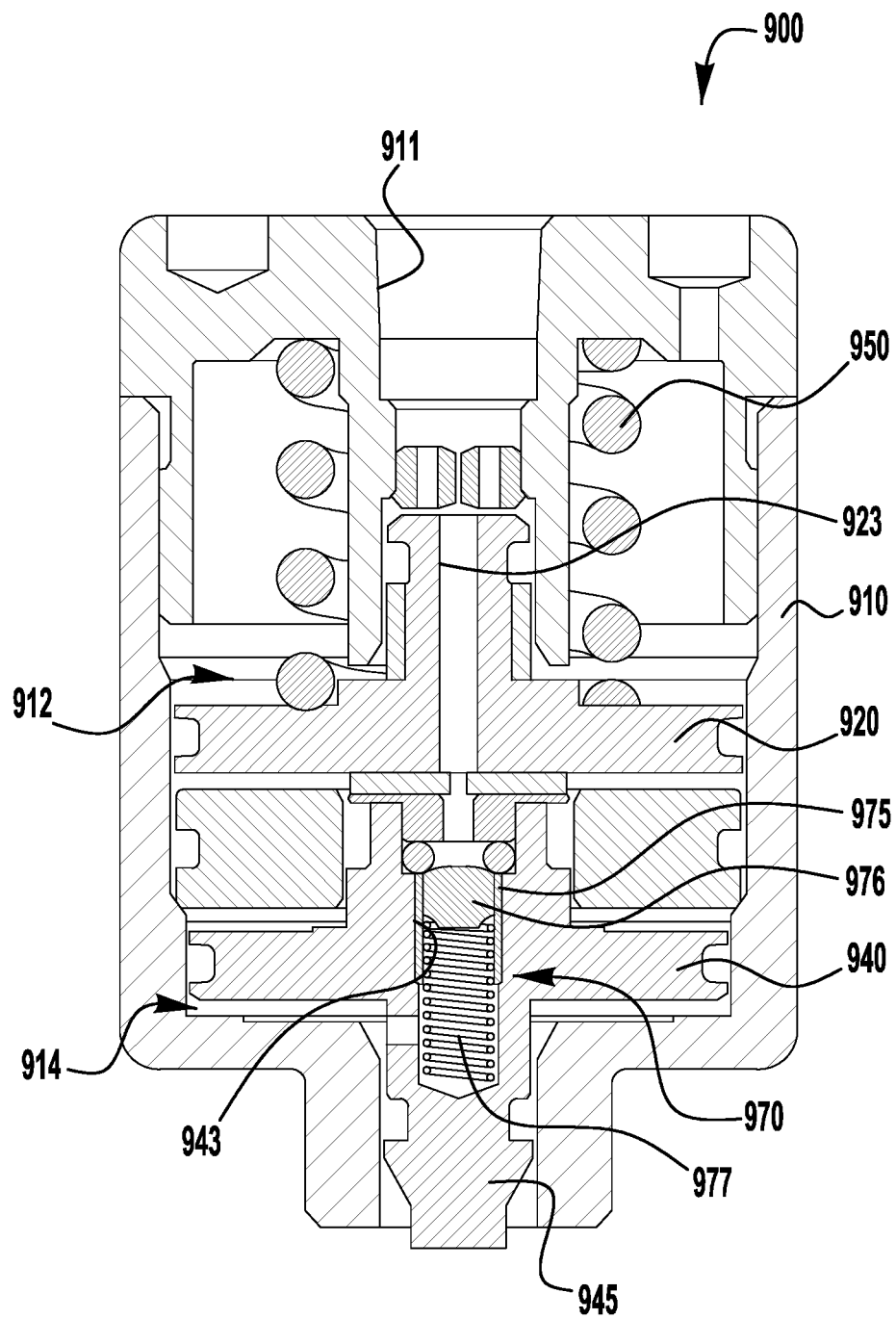
FIG. 16 is a cross-sectional view of a valve actuator, in accordance with another exemplary embodiment of the present application.

FIG. 16 illustrates another exemplary embodiment, in which a backpressure arrangement is integrated into an actuator assembly 900. The actuator assembly 900 includes a housing 910 defining an inlet port 911 and first and second piston chambers 912, 914 receiving first and second force transmitting pistons 920, 940. The second piston 940 is integrated with an output shaft 945 for applying an output force to a valve element in a valve (not shown) with which the actuator 900 is assembled. The first piston chamber 912 also retains a biasing spring 950 that engages the first piston 920 to force the first and second pistons 920, 940 downward. To operate the actuator 900, pressurized actuator fluid (e.g., air) applied to the inlet port 911 passes through passages 923, 943 in the first and second pistons 920, 940 to pressurize lower portions of the piston chambers 912, 914, forcing the pistons upward against the biasing spring 950 to move the output shaft 945 upward.

In the exemplary embodiment, a backpressure arrangement 970 is integrated into the second piston 940, including a seal member 976 biased (by spring 977) into sealing engagement with a seat 975 disposed in the second piston passage 943. When the actuator inlet port 911 is pressurized, the pressurized fluid moves the seal member 976 against the spring 977 to permit fluid flow into, and pressurization of, the lower portion of the second piston chamber 914. When the actuator 900 is depressurized, sealing engagement of the seal member 976 with the seat 975 retains pressurized fluid in the second piston chamber 914 to apply a dampening force against the second piston 940 and counter to the biasing force of the spring 977. An engineered leak path, as discussed above, may be provided, for example, in any one or more of the actuator housing, the second piston 940, the seat 975, and the seal member 976, such that over time, fluid pressure in the second piston chamber 914 is reduced or eliminated, and the full return force of the biasing spring 977 is applied to the second piston 940.

According to another exemplary aspect of the present application, an actuated valve system may be provided with a backpressure arrangement configured to limit the pressure applied to the valve actuator and the resulting "forward stroke" actuator output force, for example, to limit the closing force of a "normally open" valve actuator (e.g., to limit valve seat wear/damage). In such an arrangement, a backpressure device may be assembled with the pilot valve inlet or supply port, the actuator inlet port, or the actuator supply line to choke off the inlet pressure at a desired actuation pressure lower than the inlet or source pressure by a selected sealing differential pressure of the backpressure device. While a number of suitable backpressure devices may be utilized, in one embodiment, the backpressure device 870 of FIG. 14 may be assembled with the pilot valve inlet port in a reverse orientation relative to the embodiment of FIG. 13, such that the check/relief valve arrangement permits full pressurizing flow from the actuated valve system pressure source to the pilot valve until the pressure at the actuator inlet port reaches a selected pressure defined by a rated differential pressure at which the seal member 876 seals against the seat 875, thereby retaining a reduced actuation pressure against the actuator member. For example, if a source pressure of 80 psi is applied to an actuated valve system including a backpressure device having a differential seating pressure of 30 psi, the pressure applied to the pilot valve would be choked off at 50 psi, effectively reduce the forward stroke force output of the actuator.

In another embodiment, the backpressure device 870' of FIG. 15 may be assembled with the pilot valve supply port, the actuator inlet port, or the actuator supply line in a reverse orientation relative to the embodiment of FIG. 13, such that the check valve arrangement of the first passage 883' permits full, unrestricted flow in the venting/exhaust direct, while the check valve arrangement of the second passage 873' permits full pressurizing flow from the actuated valve system pressure source to the pilot valve until the pressure at the actuator inlet port reaches a selected pressure defined by a rated differential pressure at which the seal member 876' seals against the seat 875', thereby retaining a reduced actuation pressure against the actuator member.

The actuated valve systems described herein may additionally or alternatively be provided with other inventive features and components. As one example, an actuated valve system 800 including a backpressure device 870 for retaining a non-actuating positive pressure against the actuator 820, as described herein, may be provided with a sensor (e.g., a flow sensor or pressure sensor, shown schematically at 835 in FIG. 13) in fluid communication with the actuator supply line 829, with the sensor 835 being configured to measure a fluid flow condition in the pressurized actuator supply line corresponding to at least one of movement of the actuator member between the normal position and the actuated position, and leakage of pressurized fluid past the actuator member. The sensor 835 may be connected with (e.g., by a wired or wireless connection) a system controller 860 (e.g., computer) proximate to or remote from the pressure transducer 835, and may be similar to the embodiments of FIGS. 1, 2, 6, 8, and 10-12, described in greater detail above. In such an arrangement, leakage of actuator fluid past the actuator member may be detected by a measured pressure decrease below the pressure setting of the backpressure device by the sensor (e.g., a pressure transducer) while the pilot valve is in the closed/exhaust position.

Although the invention has been disclosed and described with respect to certain exemplary embodiments, certain variations and modifications may occur to those skilled in the art upon reading this specification. Any such variations and modifications are within the purview of the invention notwithstanding the defining limitations of the accompanying claims and equivalents thereof. Accordingly, departures may be made from such details without departing from the spirit or scope of the applicant's general inventive concept.

I claim:
1. An actuated valve system comprising:
a valve including a flow controlling valve element;
an actuator assembled with the valve and including a fluid driven actuator member operatively connected with the valve element and movable within an actuator housing from a normal position to an actuated position in response to supply of an actuating pressure to an inlet port of the actuator;
a pilot valve connected with the actuator inlet port by an actuator supply line, the pilot valve being operable to supply pressurized fluid to the actuator supply line in a first position, and to exhaust pressurized fluid from the actuator supply line in a second position;
a backpressure device including a backpressure valve configured to retain a non-actuating positive set pressure in the actuator supply line, and to release excess pressure greater than the non-actuating positive set pressure from the actuator supply line, when the pilot valve is in the second position; and
a sensor connected with the actuator supply line, the sensor being configured to measure a fluid condition in the actuator supply line corresponding to leakage of pressurized fluid past between the actuator member and the actuator housing.

2. The actuated valve system of claim 1, wherein the sensor comprises at least one of a flow sensor and a pressure sensor.

3. The actuated valve system of claim 1, wherein the backpressure device comprises at least one of a check valve and a relief valve.

4. The actuated valve system of claim 1, wherein the non-actuating positive set pressure is less than about 10 psi.

5. An actuated valve system comprising:
a valve including a flow controlling valve element;
an actuator assembled with the valve and including an inlet port in fluid communication with a fluid driven actuator member operatively connected with the valve element and movable within an actuator housing from a normal position to an actuated position in response to pressurization of the inlet port to at least a minimum actuating pressure, the actuator being configured to apply a biasing force to return the actuator member to the normal position upon depressurization of the inlet port;

a pilot valve having a supply port connected with the actuator inlet port, the pilot valve being operable to supply pressurized fluid to the actuator inlet port in a first position, and to exhaust pressurized fluid from the actuator inlet port through an exhaust port in the pilot valve in a second position; and a backpressure arrangement in fluid communication with the actuator inlet port and including a backpressure valve configured to retain a positive set pressure smaller than the minimum actuating pressure against the actuator member, and to release excess pressure greater than the positive set pressure from the actuator inlet port, when the pilot valve is moved to the second position.

6. The actuated valve system of claim 5, wherein the backpressure arrangement comprises a backpressure device having at least a first end connection for connecting with at least one of the actuator inlet port, the pilot valve, and an actuator supply line connecting the pilot valve to the actuator inlet port.

7. The actuated valve system of claim 6, wherein the backpressure device comprises at least one of a check valve and a relief valve.

8. The actuated valve system of claim 6, wherein the backpressure device is assembled with the exhaust port of the pilot valve.

9. The actuated valve system of claim 6, wherein the backpressure device is assembled with the supply port of the pilot valve.

10. The actuated valve system of claim 5, further comprising an engineered leak path in fluid communication with the actuator inlet port, the engineered leak path being configured to reduce the positive set pressure against the actuator member while the pilot valve remains in the second position.

11. The actuated valve system of claim 10, wherein the engineered leak path is integrated with the backpressure arrangement.

12. The actuated valve system of claim 5, wherein the backpressure arrangement is disposed in the actuator.

13. The actuated valve system of claim 5, wherein movement of the actuator member from the normal position to the actuated position moves the valve element from a shutoff position to a fluid flow position.

14. The actuated valve system of claim 5, wherein the positive set pressure applies a dampening force against the actuator member and counter to the biasing force to produce a net return force smaller than the biasing force.

15. The actuated valve system of claim 14, wherein the net return force is less than one half of the biasing force.

16. The actuated valve system of claim 5, wherein the positive set pressure is about 10%-90% of the minimum actuating pressure.

17. The actuated valve system of claim 5, further comprising a sensor connected with the actuator supply line, the sensor being configured to measure a fluid flow condition in the actuator supply line corresponding to at least one of movement of the actuator member between the normal position and the actuated position, and leakage of pressurized fluid between the actuator member and the actuator housing.

18. A backpressure device comprising:
a body defining a passage extending from an inlet port to an outlet port and a seat disposed in the passage; and
a seal member disposed in the body and biased into sealing engagement with the seat, the seal member separating from the seat at a set pneumatic inlet pressure to release through the outlet port any excess pneumatic pressure greater than the set pneumatic inlet pressure;
wherein the body includes an engineered leak path in fluid communication with the inlet port configured to provide a leak rate between about 0.25 sccm and 2.5 sccm at an inlet pressure equal to the set pneumatic inlet pressure.

19. The backpressure device of claim 18, wherein the set pneumatic inlet pressure is between about 10 psi and about 60 psi.

* * * * *